US011407505B2

(12) United States Patent
Gallagher, V

(10) Patent No.: US 11,407,505 B2
(45) Date of Patent: Aug. 9, 2022

(54) DYNAMICALLY ADJUSTABLE ROTORCRAFT SWASHPLATE WITH UNDULATING SURFACE

(71) Applicant: Edward F. Gallagher, V, Las Vegas, NV (US)

(72) Inventor: Edward F. Gallagher, V, Las Vegas, NV (US)

(73) Assignee: Edward F. Gallagher, V, Los Gatos, CA (US)

( * ) Notice: Subject to any disclaimer, the term of this patent is extended or adjusted under 35 U.S.C. 154(b) by 241 days.

(21) Appl. No.: 16/745,241

(22) Filed: Jan. 16, 2020

(65) Prior Publication Data
US 2021/0221498 A1 Jul. 22, 2021

(51) Int. Cl.
B64C 27/605 (2006.01)

(52) U.S. Cl.
CPC .................. B64C 27/605 (2013.01)

(58) Field of Classification Search
CPC ....... B64C 27/605; B64C 27/59; B64C 27/54; B64C 27/72; B64C 2027/7216; B64C 2027/7238; B64C 2027/7255; B64C 2027/7294
See application file for complete search history.

(56) References Cited

U.S. PATENT DOCUMENTS

| 3,841,586 | A | * | 10/1974 | Broadley | .............. | B64C 27/605 244/17.25 |
| 6,666,649 | B2 | | 12/2003 | Arnold | | |
| 7,674,091 | B2 | | 3/2010 | Zierten | | |
| 8,201,771 | B2 | | 6/2012 | Kessler et al. | | |
| 8,845,290 | B1 | * | 9/2014 | Lugg | ...................... | B64C 27/68 416/147 |
| 9,452,831 | B2 | | 9/2016 | Mayrides et al. | | |

(Continued)

FOREIGN PATENT DOCUMENTS

| EP | 1262403 | 12/2002 | |
| EP | 1262403 A2 | * 12/2002 | ........... B64C 27/605 |

(Continued)

OTHER PUBLICATIONS

Kottapalli et al., "Full-Scale Higher Harmonic Control Research to Reduce Hub Loads and Noise." Annual Forum Proceedings—American Helicopter Society. vol. 49. American Helicopter Society, 1993, 12 pages.

(Continued)

Primary Examiner — Assres H Woldemaryam
(74) Attorney, Agent, or Firm — Fish & Richardson P.C.

(57) ABSTRACT

A rotorcraft swashplate assembly includes a rotationally fixed swashplate fixed against rotating with a rotorcraft rotor. The swashplate assembly also includes a rotatable swashplate coupled to the rotor to rotate with the rotor. The swashplate assembly also includes multiple pitch change links, each pitch change link coupled to a respective rotor blade and to the rotatable swashplate to rotate with the rotor. The swashplate assembly also includes an annular track coupled to the rotationally fixed swashplate and configured to support each pitch change link riding on the annular track as each pitch change link rotates with the rotor. The track includes multiple bearings upon which a pitch change link rides, and actuators that move the bearings changing a shape of the annular track and thereby the pitch of each rotor blade as each pitch change link rides on the annular track during rotation of the rotor blades.

20 Claims, 14 Drawing Sheets

(56) References Cited

U.S. PATENT DOCUMENTS

2009/0269199 A1     10/2009  Rudley et al.
2014/0271201 A1*     9/2014  Covington ............. H02K 7/003
                                                                                                    416/134 A
2017/0057629 A1*     3/2017  Halcom ................. B64C 27/68

FOREIGN PATENT DOCUMENTS

| EP | 2516268 B1 | * | 2/2018 | ........... B64C 27/605 |
| GB | 2108917 | * | 5/1983 | ............. B64C 27/58 |
| GB | 2457685 | * | 8/2009 | ........... B64C 27/605 |

OTHER PUBLICATIONS

Nixon et al., "Higher harmonic control for tiltrotor vibration reduction." 1997, 8 pages.
Nguyen et al., "Full-Scale DemonsliaLion of Higher Harmonic Control for Noise and Vibration Reduction on the XV-15 Rotor." Journal of the American Helicopter Society 46.3, Jul. 1, 2001, 13 pages.
Patt et al., "Higher-harmonic-control algorithm for helicopter vibration reduction revisited." Journal of guidance, control, and dynamics 28.5, Sep. 28, 2005, 13 pages.
Nguyen, "Higher harmonic control analysis for vibration reduction of helicopter rotor systems." Oct. 1994, 138 pages.
Straub et al., "Application of higher harmonic blade feathering on the OH-6A helicopter for vibration reduction." 1986, 190 pages.
International Search Report and Written Opinion in International Appln. No. PCT/US2021/013215, dated Oct. 1, 2021, 19 pages.

* cited by examiner

DYNAMICALLY ADJUSTABLE ROTORCRAFT SWASHPLATE WITH UNDULATING SURFACE

TECHNICAL FIELD

This disclosure relates to rotorcrafts, and more specifically to rotorcraft swashplates.

BACKGROUND

Rotorcrafts use lift generated by rotor blades that rotate at high tip speeds to take off and land vertically, hover, and fly in different directions. The rotation of the mechanical components of the rotor system cause vibrations which are transmitted throughout the rotorcraft structure. For example, during operation, multiple conditions such as hub shear loads, out-of-balance components, or worn bearings can cause excessive vibrations of the rotor blades and other components that hinder the performance of the rotorcraft. Reducing critical rotorcraft vibrations is desirable.

SUMMARY

Implementations of the present disclosure include a rotorcraft swashplate assembly that includes a rotationally fixed swashplate configured to be fixed against rotating with a rotorcraft rotor that rotates about a rotational axis. The rotorcraft swashplate assembly also includes a rotatable swashplate configured to reside between rotor blades of the rotor and the rotationally fixed swashplate, and configured to be coupled to the rotor to rotate with the rotor. The rotorcraft swashplate assembly also includes multiple pitch change links, each pitch change link configured to be coupled to a respective rotor blade, to the rotorcraft rotor, and to the rotatable swashplate to rotate with the rotor. The rotorcraft swashplate assembly also includes an annular track coupled to the rotationally fixed swashplate and is configured to support each pitch change link riding on the annular track as each pitch change link rotates with the rotor. The annular track includes multiple bearings each including a surface upon which a pitch change link rides. The annular track also includes multiple actuators coupled to the rotationally fixed swashplate and to the multiple bearings to move at least some of the bearings independently from other bearings, changing a shape of the annular track and thereby the pitch of each rotor blade connected to a respective pitch change link as each pitch change link rides on the annular track during rotation of the rotor blades.

In some implementations, the multiple actuators are linear actuators configured to move parallel to the rotational axis. Each of the multiple linear actuators includes a first end coupled to at least one respective bearing of the multiple bearings, with each of the multiple linear actuators configured to move the at least one respective bearing to which the linear actuator is coupled. In some implementations, In some implementations, the assembly further includes a processing device communicatively coupled to the multiple actuators. The processing device is configured to independently actuate each actuator based on real-time data received from rotorcraft sensors. In some implementations, the multiple actuators are configured to change an elevation of the bearings with respect to the rotationally fixed swashplate at specified azimuth locations around the annular track such that the multiple actuators change the pitch of the rotor blade at specified azimuth locations as each pitch change link rides on the multiple bearings during rotation of the rotor blade.

In some implementations, each pitch change link includes a roller configured to ride on the annular track. In some implementations, each pitch change link is configured to extend through an aperture of the rotatable swashplate. The swashplate assembly includes a spring disposed around each pitch change link between the roller and a surface of the rotatable swashplate configured to bias the pitch change link against the annular track.

In some implementations, the bearings are arranged to form an annular surface of the annular track and their movement enable the surface to undulate around the annular track.

In some implementations, each bearing of the multiple bearings includes one of 1) a roller bearing, 2) a curved structure, or 3) a curved structure with a flat top surface. In some implementations, the multiple bearings are staggered along the annular track and arranged in rows of alternating numbers of bearings, each row offset to each other such that bearings of one row nest with bearings of an adjacent row.

In some implementations, the annular track further includes a ring structure attached to the rotationally fixed swashplate. The ring structure defines multiple channels, each channel configured to receive a portion of a respective actuator from a bottom surface of the ring structure and at least a portion of a respective bearing from a top surface of the ring structure to support the respective portions of the multiple actuators and the multiple bearings. In some implementations, the top surface of the ring structure supports the pitch change link when the bearings are fully retracted below the top surface of the ring structure. In some implementations, the bearings fully retract below the top surface of the ring structure when the respective actuators lose power or are deactivated.

In some implementations, each pitch change link is a telescopic pitch change link including a first arm configured to be attached to the rotatable swashplate and coupled to a second arm configured to be attached to the respective rotor blade. The second arm includes the roller and is configured to move with respect to the first arm as the roller rides on the annular track during rotation of the rotor blade.

In some implementations, the assembly further includes a processing device that includes a control system configured to actuate each actuator based on manual input and sensor input to undulate the annular track.

Implementations of the present disclosure include a method of operating a rotorcraft. The method includes, on a rotorcraft including a swashplate assembly including 1) a rotationally fixed swashplate, 2) a rotatable swashplate, 3) multiple pitch change links, each pitch change link coupled to a respective rotor blade and to the rotatable swashplate, and 4) an annular track coupled to the rotationally fixed swashplate to support each pitch change link as each pitch change link rotates with the rotor to ride on the annular track, the annular track including multiple actuators configured to move the annular track, controlling a number of actuators of the multiple actuators. The actuators are controlled to change a surface shape of the annular track such that the annular track changes the pitch of the pitch change links as the pitch change links ride on the annular track to at least one of 1) counteract rotational vibrations of the rotor blades attached to the pitch change links or 2) adjust a pitch of the pitch change links at a specific azimuth location of the pitch change links.

In some implementations, the method further includes, prior to controlling the number of actuators, receiving, by a processing device and from multiple sensors attached to the rotorcraft, multiple values representing at least one of 1)

operating parameters of the rotorcraft collected over time, 2) environmental data, and (3) control inputs. In some implementations, the multiple values include at least one of the following: airspeed of the rotorcraft, gross weight of the rotorcraft, center of gravity of the rotorcraft, pressure altitude, temperature, wind speed, wind direction, height above ground of the rotorcraft, sideslip angle of the rotorcraft, rotor speed, engine torque applied to the rotor, rotor blade pitch position and location for each rotor blade, tail rotor blade pitch position and location, a degree difference at which a pitch change link input affects the position and state of the blade, flight control mixing data, status and mode of vibration control systems, position of in-line automatic flight control system servos, blade flap angle, lead-lag location of blade, lead-lag damper characteristics, and flight control position for one or more of 1) collective, 2) lateral cyclic, 3) longitudinal cyclic, or 4) pedal position.

In some implementations, controlling the number of actuators includes controlling, by the processing device and based on the multiple values, the actuators to undulate the annular track.

Implementations of the present disclosure include a swashplate assembly that includes a swashplate configured to be fixed against rotating with a rotorcraft rotor. The swashplate assembly also includes multiple pitch change links. Each pitch change link is coupled to a respective rotor blade of a rotorcraft and to a rotorcraft rotor to rotate with the rotor, each pitch change link is configured to ride on an annular track of the rotationally fixed swashplate. The annular track is configured to undulate to change a pitch of each rotor blade connected to a respective pitch change link as each pitch change link rides on the annular track during rotation of the rotor blade.

In some implementations, the swashplate assembly further includes a processing device communicatively coupled to the annular track. The processing device is configured to undulate the annular track based on data received from one or more of 1) manual inputs and 2) sensor data.

Implementations of the present disclosure also include a rotorcraft swashplate assembly that includes a rotationally fixed swashplate configured to be fixed against rotating with a rotorcraft rotor configured to rotate about a rotational axis. The rotorcraft swashplate assembly also includes a rotatable swashplate configured to reside between rotor blades of the rotor and the rotationally fixed swashplate, and configured to be coupled to the rotor to rotate with the rotor. The rotorcraft swashplate assembly also has multiple pitch change links, each pitch change link configured to be coupled to a respective rotor blade, to the rotorcraft rotor, and to the rotatable swashplate to rotate with the rotor. The rotorcraft swashplate assembly also includes an annular rail coupled to the rotationally fixed swashplate to support a roller assembly of each pitch change link as each pitch change link rotates with the rotor. The roller assembly of each pitch change link is arranged to engage with and ride on the annular rail such that each pitch change link is, when engaged with the annular rail, constrained to movement along the annular rail and prevented from disengaging the rail. The annular rail includes multiple interconnected rail members, each including a surface upon which a pitch change link rides. The annular rail also includes multiple actuators coupled to the rotationally fixed swashplate and to the multiple rail members to move at least some of the rail members independently from other rail members changing a shape of the annular rail and thereby the a pitch of each rotor blade connected to a respective pitch change link as each pitch change link rides on the annular rail during rotation of the rotor blades.

In some implementations, the roller assembly of each pitch change link includes two or more rollers arranged to ride along different surfaces of the annular rail to prevent the roller assembly from disengaging the annular rail as the roller assembly of each pitch change link rides on the annular rail during rotation of the rotor blade.

In some implementations, the movable rail members are interconnected by a flexible link extending through an aperture of each rail member to form a chain of interconnected rail members. In some implementations, the flexible link includes an adjustable fitting including a spring disposed between two end caps. One of the end caps is threadedly connected to the flexible link to adjust, as the cap moves along the flexible link, a preload of the spring to adjust a length of the flexible link.

In some implementations, each rail member includes a tapered end and a notched end opposite the tapered end, the notched end of each rail member configured to receive a tapered end of an adjacent rail member to form, collectively, a ring-shaped rail assembly.

In some implementations, the multiple actuators are linear actuators and each rail member is coupled to two or more linear actuators that are configured to move independently from each other to tilt the respective rail member independent from other rail members.

In some implementations, each rail member includes chamfered edges or beveled edges that allow adjacent rail members to tilt in opposite directions to allow the roller assembly to transition between tilted, adjacent rail members.

In some implementations, each rail member includes a circular angularity such that when interconnected, the rail members form together a ring-shaped annular rail.

Implementations of the present disclosure also include a rotorcraft swashplate assembly that includes a rotationally fixed swashplate configured to be fixed against rotating with a rotorcraft rotor configured to rotate about a rotational axis. The swashplate assembly also includes a rotatable swashplate configured to reside between rotor blades of the rotor and the rotationally fixed swashplate, and configured to be coupled to the rotor to rotate with the rotor. The swashplate assembly also includes multiple pitch change links, each pitch change link configured to be coupled to a respective rotor blade, to the rotorcraft rotor, and to the rotatable swashplate to rotate with the rotor. The swashplate assembly also includes an annular track coupled to the rotationally fixed swashplate and configured to support a roller of each pitch change link riding on the annular track as each pitch change link rotates with the rotor. The annular track includes a piezoelectric ring including a surface upon which a pitch change link rides. The annular track also includes multiple actuators arranged along the piezoelectric ring and coupled to the rotationally fixed swashplate. Each actuator of the multiple actuators is configured to apply a voltage independently from the other actuators, changing a shape of the piezoelectric ring at specific azimuth locations of the ring and thereby changing a pitch of each rotor blade connected to a respective pitch change link as each pitch change link rides on the piezoelectric ring during rotation of the rotor blade.

In some implementations, the multiple actuators are configured to flex upwardly the piezoelectric ring at specific azimuth locations of the piezoelectric ring with respect to the rotationally fixed swashplate such that the multiple actuators change the pitch of the rotor blade at specific azimuth locations as the roller of each pitch change link rides on the piezoelectric ring during rotation of the rotor blade.

In some implementations, the multiple actuators are configured to change a shape of the piezoelectric ring at specific azimuth locations to form an adjustable hoop with an undulating surface extending along a length of the track.

In some implementations, the swashplate assembly also includes a processing device communicatively coupled to the multiple actuators. The processing device is configured to independently actuate each actuator based on real-time data received from rotorcraft sensors.

In some implementations, the track further includes a ring structure attached to the rotationally fixed swashplate. The ring structure defines multiple channels, each channel configured to receive a portion of a respective actuator from a bottom surface of the ring structure and at least a portion of the piezoelectric ring from a top surface of the ring structure to support the respective portions of the multiple actuators and piezoelectric ring.

In some implementations, the multiple actuators include voltage generators arranged evenly along the track.

In some implementations, the piezoelectric ring includes multiple piezoelectric members that collectively form the piezoelectric ring. Each actuator of the multiple actuators is configured to apply a voltage independently from the other actuators to change a shape of at least some of the multiple piezoelectric members independently from other piezoelectric members.

Implementations of the present disclosure also include a rotorcraft swashplate assembly that includes a rotationally fixed swashplate configured to be fixed against rotating with a rotorcraft rotor configured to rotate about a rotational axis. The rotorcraft swashplate assembly also includes a rotatable swashplate configured to reside between rotor blades of the rotor and the rotationally fixed swashplate, and is configured to be coupled to the rotor to rotate with the rotor. The rotorcraft swashplate assembly has multiple pitch change links. Each pitch change link is configured to be coupled to a respective rotor blade, to the rotorcraft rotor, and to the rotatable swashplate to rotate with the rotor. The rotorcraft swashplate assembly also includes multiple electromagnets arranged along and coupled to the rotationally fixed swashplate. Each of the multiple electromagnets are configured to generate an electromagnetic field to repel a magnet of each pitch change link as each pitch change link rotates with the rotor. The magnet is oriented to produce a magnetic field in a direction opposite to the electromagnetic fields of the multiple electromagnets. Each of the multiple electromagnets is configured to generate an electromagnetic field with a strength independent from the electromagnetic fields generated by the other electromagnets to change a pitch of each rotor blade connected to a respective pitch change link as the magnet of each pitch change link is repelled from the multiple electromagnets during rotation of the rotor blade.

In some implementations, the rotorcraft swashplate assembly also includes a processing device electrically coupled to the multiple electromagnets. Each of the electromagnets includes a conductor around a magnetic core and is electrically coupled to the processing device. The processing device is configured to change one or more parameters of a current flowing through the conductor around the magnetic core to change a strength of the respective electromagnetic field.

In some implementations, the processing device is configured to change the strength of the respective electromagnetic field based on real-time data received, by the processing device, from rotorcraft sensors.

In some implementations, the magnet of each pitch change link is a second electromagnet. Each of the multiple electromagnets are configured to generate an electromagnetic field to repel the second electromagnet of each pitch change link as each pitch change link rotates with the rotor. The second electromagnet is configured to generate a second electromagnetic field in a direction opposite to the electromagnetic fields of the multiple electromagnets.

In some implementations, the multiple electromagnets are configured to change a strength of their respective electromagnetic field to change the pitch of the rotor blade at specific azimuth locations as the magnet of each pitch change link is repelled by the multiple electromagnetic fields during rotation of the rotor blade.

In some implementations, the multiple electromagnets are arranged evenly along the rotationally fixed swashplate to form a continuous or generally continuous ring-shaped electromagnetic field.

Particular implementations of the subject matter described in this specification can be implemented so as to realize one or more of the following advantages. The disclosed swashplate system uses data received from rotorcraft sensors to change an undulation of a surface touching the pitch change links to allow higher harmonic control of the rotor pitch. Such harmonic control can reduce the rotorcraft vibrations. The disclosed swashplate system can reduce the frequency of vibrations, and vertical and lateral vibrations. The disclosed swashplate system can also reduce the acoustic signature of the rotorcraft. The disclosed swashplate system can reduce vibrations that can be detrimental to the human body. The disclosed swashplate system can reduce vibrations and required torque, resulting in an increase in fuel efficiency, range, and life of rotorcraft components. The disclosed swashplate system features multiple variable modes of higher harmonic control (HHC) and allows individual blade control at certain azimuths. The disclosed swashplate system can be implemented in an existing rotorcraft (e.g., by retrofitting an existing rotorcraft) or built-in with a new rotorcraft.

The details of one or more implementations of the subject matter described in this disclosure are set forth in the accompanying drawings and the description herein. Other features, aspects, and advantages of the subject matter will become apparent from the description, the drawings, and the claims.

DETAILED DESCRIPTION

The present disclosure describes a rotorcraft swashplate assembly that uses a control system (e.g., an open or closed loop feedback control system) to move the pitch change links of a rotorcraft to control the rotor pitch at specific azimuth locations. The control system uses inputs from rotorcraft sensors to determine a shape of a surface on which the pitch change links ride as the pitch change links rotate with the rotor. For example, the surface can be undulated by actuators activated by the control system. The undulating surface can be shaped to put the blade pitch at an optimal angle/location at a specific azimuth. Additionally, the undulating surface can create aerodynamic vibrations in the rotor blades that counteract the rotational vibrations created by the mass of the rotating components. For example, the control system can create aerodynamic vibrations in the rotor blades that minimize the mechanical vibrations of the rotor blades. The undulating surface may also allow other forms of higher harmonic vibrations to be introduced into the rotor system that can be beneficial to the rotorcraft.

Figure 1:
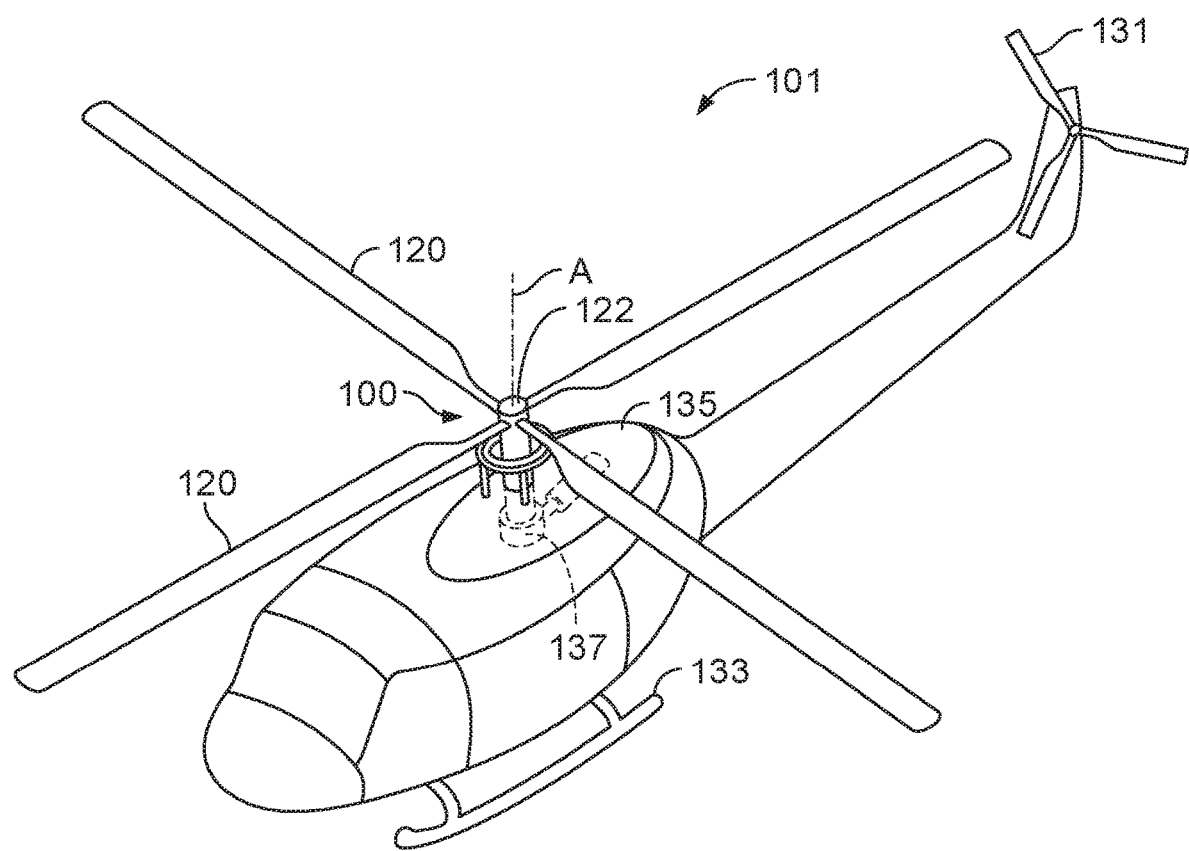
FIG. 1 is a schematic perspective view of a rotorcraft.

FIG. 1 shows a rotorcraft 101 that includes a rotorcraft body 135, a rotor 122 extending from the body 135, a drive 137 attached to the rotor 122, and a rotorcraft swashplate assembly 100. The rotorcraft 101 also includes blades 120 attached to the rotor 122, a tail rotor 131, and landing skids 133. The rotor 122 rotates about a rotational central axis 'A' to rotate the blades 120. The rotorcraft swashplate assembly 100 can be used in any rotorcraft that uses a swashplate to control the pitch of the rotor blades. The control system can further be adapted to work with short mast rotorcraft where each pitch change horn connects directly to a controlled undulating surface without the use of a pitch change link.

Figure 2:
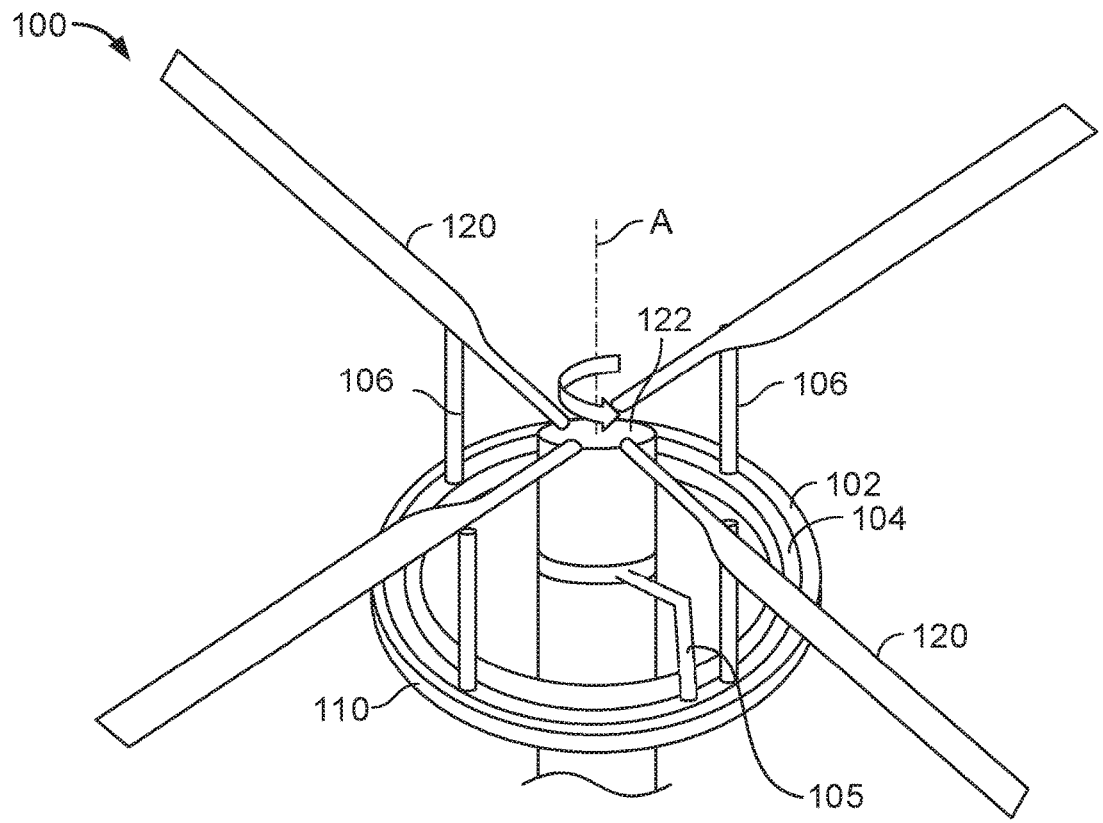
FIG. 2 is a schematic perspective view of a rotorcraft swashplate assembly.

FIG. 2 shows a rotorcraft swashplate assembly or system 100 that includes a rotationally fixed swashplate 102 (e.g., a non-rotating plate), a rotatable swashplate 104 (e.g., a rotating plate), and multiple pitch change links 106 attached to respective rotor blades 120 extending from a rotorcraft rotor 122. The pitch change links 106 can also be attached to the rotor 122 to rotate with the rotor. The rotationally fixed swashplate 102 is fixed against rotating with the rotorcraft rotor 122. For example, the rotationally fixed swashplate 102 can be attached to the body 135 of the rotorcraft independent from the rotor 122. The rotatable swashplate 104 resides between the rotor blades 120 of the rotor 122 and the rotationally fixed swashplate 102. For example, the rotatable swashplate 104 can reside on top of the rotationally fixed swashplate 102 or inside or partially inside the rotationally fixed swashplate 102. The rotatable swashplate 104 is coupled, through one or more rotating scissors 105 and pitch change links 106, to the rotor 122 to rotate with the rotor 122.

Figure 3:
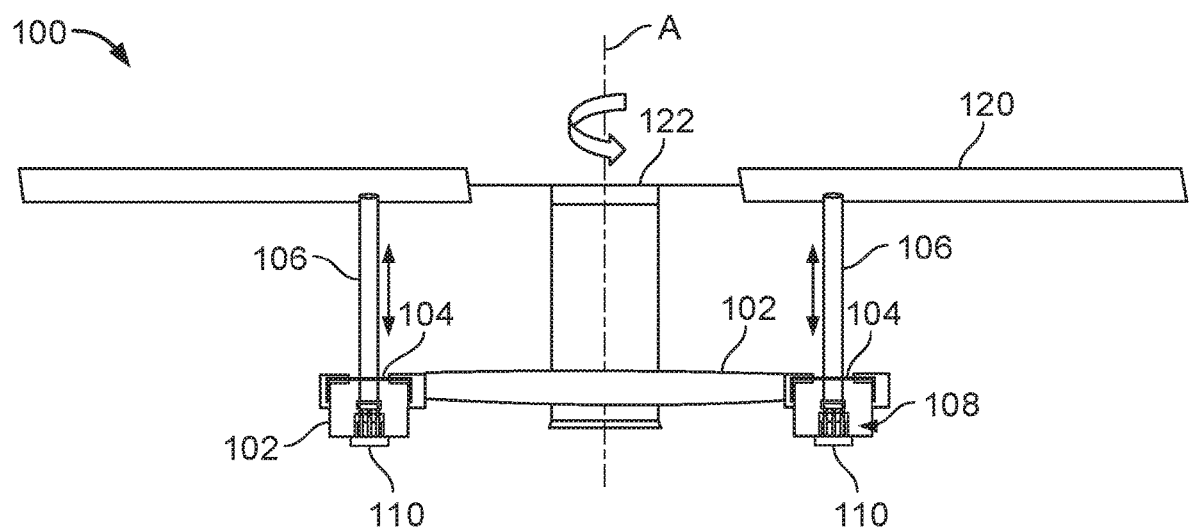
FIG. 3 is a schematic front view, partially cross-sectional, of the rotorcraft swashplate assembly of FIG. 2.

FIG. 3 shows a configuration of the rotationally fixed swashplate 102 featuring a housing around the swashplate 102 that supports a variable annular track 108 of the rotorcraft swashplate assembly 100. Each pitch change link 106 is coupled to a respective rotor blade 120, to the rotorcraft rotor, and to the rotatable swashplate 104 to rotate with the rotor 122. For example, as further described in detail with respect to FIG. 5, each pitch change link 106 can extend through an aperture of the rotatable swashplate 104 to ride on the annular track 108 inside the rotationally fixed swashplate 102.

Figure 4:
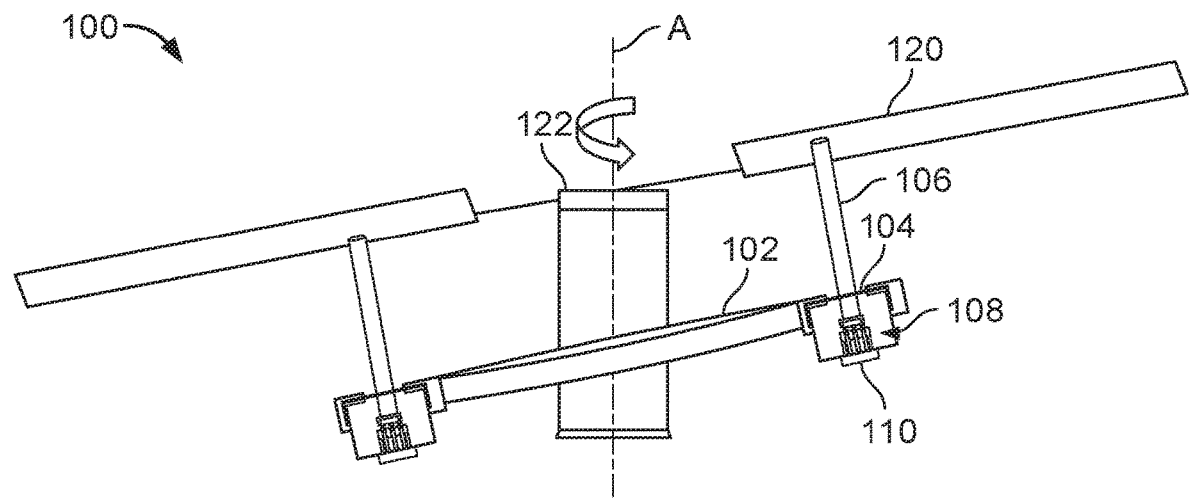
FIG. 4 is a schematic front view, partially cross-sectional, of the rotorcraft swashplate assembly of FIG. 2, tilted.

FIG. 4 shows the rotorcraft swashplate assembly 100 tilted to tilt the rotor blades 120. For example, the rotationally fixed swashplate 102 can be tilted by rotationally fixed links (not shown) to tilt the rotor blades 120 to a desired pitch angle. The rotationally fixed links can collectively raise and lower the rotationally fixed swashplate 102 to collectively increase the pitch of the rotor blades 120 a constant amount between all blades 120. The rotorcraft swashplate assembly 100 works to control the pitch of the rotors blades 120 regardless of a tilt inclination of the rotorcraft swashplate assembly 100. Although the rotatable swashplate 104 is shown inside the rotationally fixed swashplate 102, the rotatable swashplate 104 can be disposed outside or partially outside the rotationally fixed swashplate 102.

Figure 5:
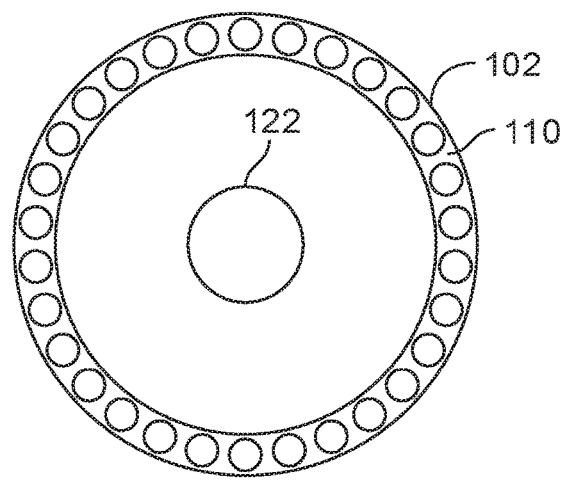
FIG. 5 is a schematic bottom view of a rotationally fixed swashplate with actuators.

FIG. 5 shows a bottom view of the rotationally fixed swashplate 102 with the multiple actuators 110 attached to the housing of the rotationally fixed swashplate 102. The actuators 110 can be evenly arranged along the annular track 108 (e.g., along a circumference of the rotationally fixed swashplate 102). The rotationally fixed swashplate 102 can have, for example, 8 actuators 110 per rotor blade or more. It will be appreciated that more actuators will produce a finer control and fewer actuators will produce a coarser control. The actuators 110 can be, for example, mechanical, electrical, or electromechanical linear actuators, hydraulic linear actuators, pneumatic linear actuators, or piezoelectric actuators. As further described in detail below with respect to FIG. 9, each actuator 110 can move independently from other actuators 110 to change a pitch of the rotor blades 120 (see FIG. 4) at specific radial or azimuth locations of the rotationally fixed swashplate 102 as the pitch change links 106 ride on the annular track that is moved by the actuators 110.

Figure 6A:
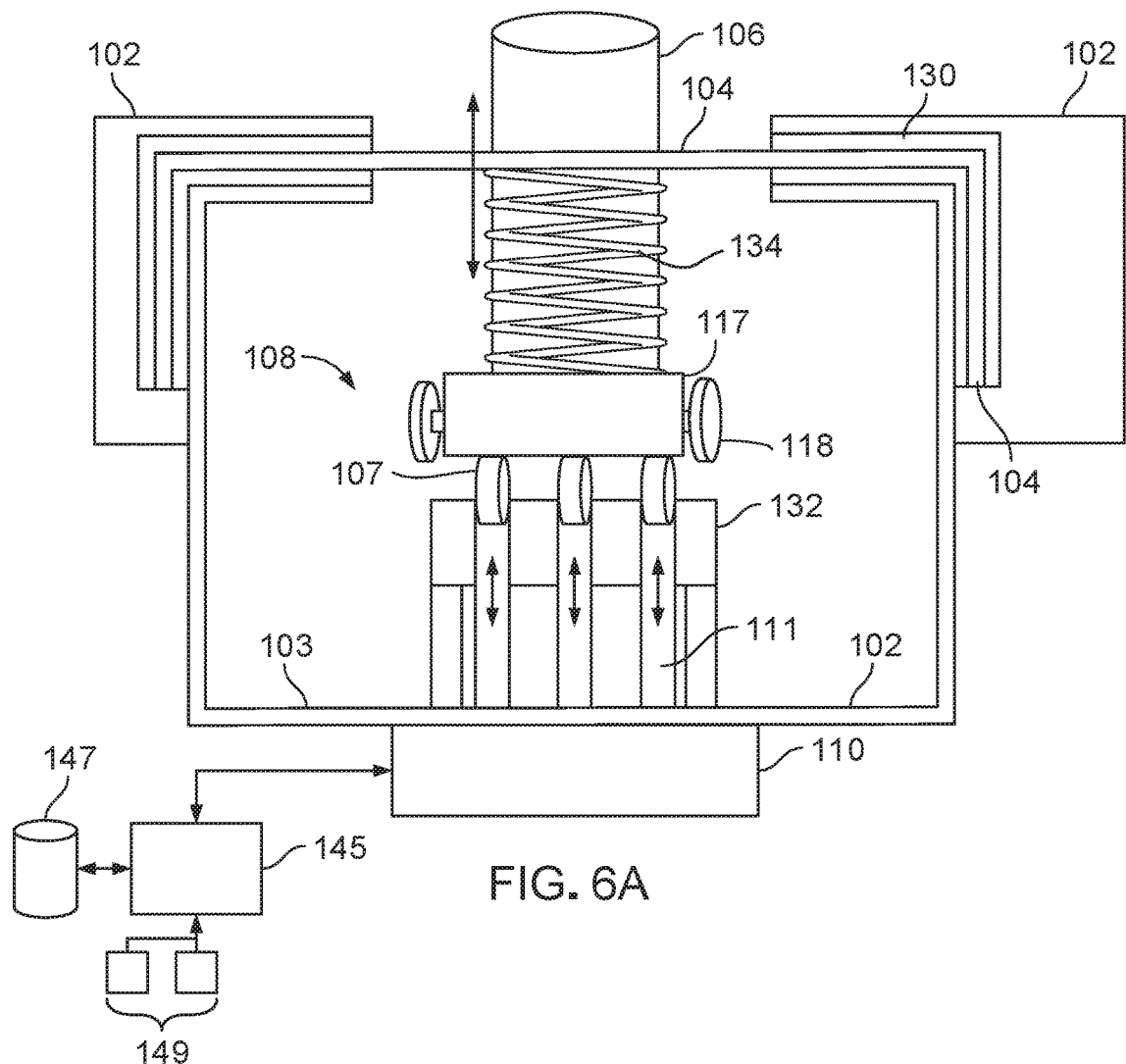
FIG. 6A is a schematic front view, partially cross-sectional, of a portion of a rotorcraft swashplate assembly, according to a first implementation.

FIG. 6A shows a portion of the rotorcraft swashplate assembly 100 according to a first implementation of the present disclosure. Specifically, FIG. A6 illustrates a housing of the rotationally fixed swashplate 102 supporting the annular track 108 that supports a pitch change link 106 attached to a rotor blade 120 (See FIG. 4). The housing of the rotationally fixed swashplate 102 extends generally along a periphery of the rotationally fixed swashplate 102. The rotatable swashplate 104 is contained within a top portion of the housing, with bearings 130 (e.g., roller bearings or a surface that bears weight) between the rotatable swashplate 104 and the housing or body of the rotationally fixed swashplate 102. The bearings 130 allow the rotatable swashplate 104 to rotate with respect to the rotationally fixed swashplate 102. As the rotatable swashplate 104 rotates with the rotorcraft rotor, the pitch change links 106 also rotates with the rotor. For example, the pitch change link 106 extends through an aperture of the rotatable swashplate 104 to rest on the annular track 108 and rotate or revolve along with the rotatable swashplate 104. In some implementations, each pitch change link 106 can include a mechanical articulating joint (not shown) such as a Heim joint to allow angular movement of the pitch change link. The annular track 108 is coupled to a bottom surface 103 of the rotationally fixed swashplate 102 to support a bearing structure 117 of each pitch change link 106 as each pitch change link 106 rotates with the rotor. The bearing structure 117 rides on the annular track and can be, for example, a roller, a curved structure (e.g., a fixed ball), a flat plate, or a wheel. The bearing structure 117 of each pitch change link 106 is oriented to ride on the annular track 108 as a top surface of the annular track 108 varies or undulates to vertically move each pitch change link 106 as each pitch change link 106 rotates with rotorcraft rotor. In some implementations, the bearing structure 117 (or the annular track 108) includes fail safe bearings 118 on which the pitch change link 106 can ride when the actuators 110 are retracted (e.g., when the actuators fail or lose power).

The annular track 108 has multiple movable bearings 107 (e.g., roller bearings) that serve as cams to move the pitch change link 106. The bearings 107 form a 'swashwave' or an undulating surface on which the pitch change links 106 ride. As further described in detail below with respect to FIGS. 10 and 11, the bearings 107 can be any structure that bears friction or supports a weight from a moving element, such as a roller bearing or a curved structures. The bearings 107 support the bearing structure 117 of each pitch change link 106 as the pitch change links 106 rotate to ride on the bearings 107. The annular track 108 also includes multiple actuators 110 coupled (e.g., mechanically attached) to a bottom surface of the rotationally fixed swashplate 102. The multiple actuators 110 are coupled to multiple bearings 107 to move at least some of the bearings 107 independently from other bearings 107. The actuators 110 move the bearings 107 to change a pitch of each rotor blade connected to a respective pitch change link 106 as the bearing structure 117 of each pitch change link 106 rides on the movable bearings 107 during rotation of the rotor blade. Each actuator 110 can have an arm 111 that extends or retracts to move a respective roller bearing 107. For example, each arm 111 can be coupled to a respective roller bearing 107 to move a respective roller bearing 107, or multiple respective roller bearings 107, independently from other roller bearings 107.

Figure 7:
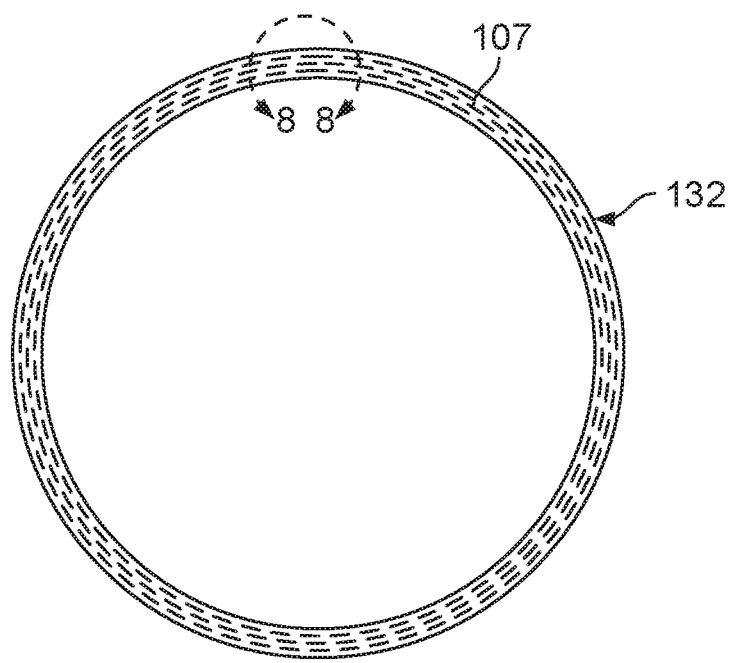
FIG. 7 is a schematic top view of an annular track with movable bearings.

Referring also to FIG. 7, the annular track 108 also includes a ring structure 132 fixed to the rotationally fixed swashplate 102, the ring structure 132 defines multiple channels or openings that receive a portion of a respective actuator 110 (e.g., a portion of the arm 111) from a bottom surface of the ring structure 132 and at least a portion of a respective bearing 107 from a top surface of the ring structure 132. The ring structure 132 supports or vertically aligns the arms 111 of the actuators 110 and the bearings 107. The top surface of the ring structure 132 supports the pitch change link 106 when the bearings 107 are fully retracted below the top surface of the ring structure 132. The bearings 107 fully retract below the top surface of the ring structure 132 when the respective actuators 110 lose power or are deactivated, allowing the fail safe bearings 118 of the pitch change link 106 to rotate and ride normally along the ring structure 132.

The pitch change link 106 extends through an aperture of the rotatable swashplate 104 to rest on the annular track 108. The aperture is sized to prevent lateral movement of the pitch change link 106. The aperture is large enough to allow the pitch change link 106 to move up and down (e.g., along a vertical axis of the pitch change link 106) relative to the rotatable swashplate 104. The pitch change link 106 is engaged with a compression spring 134 disposed around the pitch change link 106 between the bearing structure 117 and a surface of the rotatable swashplate 104 to bias the pitch change link 106 against the annular track 108. The spring 134 helps ensure that the pitch change link 106 is always riding on the surface of the annular track 108.

As shown in FIG. 6A, the rotorcraft swashplate assembly 100 is part of a control system that includes a processing device 145 (e.g., a computer processor) communicatively coupled to multiple actuators 110. The control system can be or operate as a feedback control system (e.g., a closed loop control system) or a 'dumb' control system (e.g., an open loop control system). The processing device 145 can independently actuate, based on feedback (e.g., real-time data) received from multiple rotorcraft sensors 149, the actuators 110. In some implementations, the processing device 145 is communicatively coupled to a memory 147 (e.g., a computer-readable medium) that stores instructions to execute a function to reduce harmonic vibrations of the rotorcraft. The processing device 145 controls the actuators 110 to change an elevation of the bearings 107 to form an undulating surface that extends along the rotationally fixed swashplate 102. For example, the actuators 110 vertically move the bearings to form an adjustable hoop or ring with an undulating surface extending along a length of the annular track 108. The undulating surface can be controlled such that, as the pitch change link 106 rides on the undulating surface, the pitch of the rotor blade attached to the pitch change link 106 can be changed at specific azimuth locations during rotation of the rotor blade. The undulating surface can be shaped to put the blade pitch at an optimal angle/location at a specific azimuth. Additionally, the undulating surface can create aerodynamic vibrations in the rotor blades that counteract the rotational vibrations created by the mass of the rotating components. It will be understood that the additional configurations of the rotorcraft swashplate assembly 100 described below include a similar control system.

The rotorcraft sensors 149 can include any sensors that detect the parameters received by the processing device 145. The processing device 145 receives these parameters from the sensors as inputs that include airspeed of the rotorcraft, gross weight of the rotorcraft, center of gravity of the rotorcraft, pressure altitude, temperature, wind speed, wind direction, height above ground of the rotorcraft, sideslip angle of the rotorcraft, rotor speed, engine torque applied to the rotor, rotor blade pitch position and location for each rotor blade, tail rotor blade pitch position and location, a pitch-difference degree (e.g., a degree difference at which a pitch change link input affects the position and state of the blade at typical operating rotor speeds [Nr]), flight control mixing data, status and mode of vibration control systems, position of in-line automatic flight control system servos, blade flap angle, lead-lag location of blade, lead-lag damper characteristics, and flight control position for one or more of 1) collective, 2) lateral cyclic, 3) longitudinal cyclic, or 4) pedal position.

The processing device 145 determines the shape of the undulating surface based on real time or near real time data received from the rotorcraft sensors 149. For example, the undulating surface can be shaped to follow a wave function such as an aperiodic wave, a sine wave, or other wave functions. By "real time," it is meant that a duration between receiving an input (e.g., a sensor input or a manual input from the pilot) and processing the input to provide an output can be minimal, for example, in the order of seconds, milliseconds, microseconds, or nanoseconds.

The processing device 145 can be or include any processor(s) configured to process instructions for execution within the system. The processing device 145 can be configured to process instructions stored in the memory 147 or on storage device(s). The processing device 145 may include hardware-based processor(s) each including one or more cores. The processing device 145 may include general purpose processor(s), special purpose processor(s), or both.

Figure 6B:
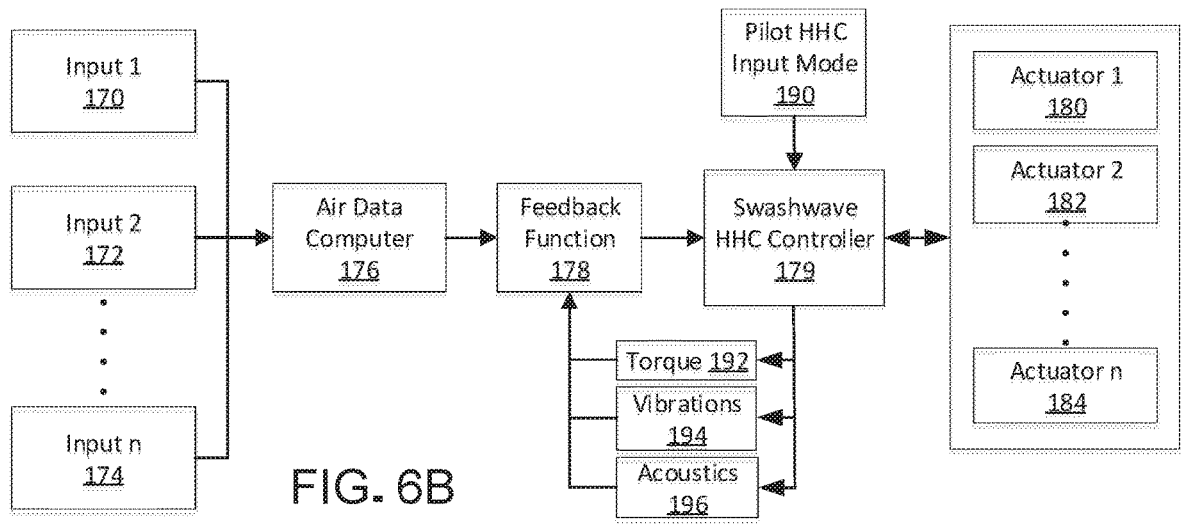
FIG. 6B is a block diagram of an example rotorcraft swashplate control system.

FIG. 6B is an example block diagram of a closed loop control system. The control system includes an air data computer 176 that receives inputs 170, 172, and 174 representing the parameters from the rotorcraft sensors. The air data computer 176 transmits the sensor data to a swashwave HHC controller 179 that controls the actuators 180, 182, 184 of the swashplate assembly to undulate the surface of the annular track 108. The air data computer 176 can use a feedback function 178 that uses rotorcraft feedback inputs such as torque 192, vibrations 194, and acoustics 196 of the rotorcraft to determine the shape of the annular track 108. Such feedback can be used to fine tune the controller settings. The swashwave HHC controller 179 can also receive input from the pilot such as a pilot HHC input mode 190. The pilot HHC input mode 190 can be used to change the function performed by the control system to reduce vibrations, for example, or to reduce the acoustic signature of the rotorcraft. For example, the pilot HHC input mode 190 can be an On mode, an Off mode, a vibration mode, an acoustic mode, a performance torque mode, or an 'all' mode, in which vibrations, acoustic signature, and performance torque are all reduced. The commanded modes of the swashwave HHC controller 179 that are sent to the surface can be originally based on theory/models, then on computational fluid dynamics models, then flight test tweaking of those parameters. In an acoustic reduction mode, the controller 179 can run different programmed algorithms and tweaking amplitudes or harmonic oscillation inputs to reduce the acoustic load being actively measured from acoustic signatures. A similar procedure could work for torque reduction, where the controller 179 fine tunes its preprogrammed best guess (based on flight test and research) and finds a solution in the surface shape (the wave function) that results in the minimum torque required to achieve the desired airspeed or aircraft state. In some implementations, the controller 179 can use a machine-learning process (e.g., neural networks) to fine tune the surface shape of the annular track 108. The swashwave HHC controller 179 can have a two-way communication with the actuators to continuously (or generally continuously) monitor the actuators to ensure the calculated wave function is being properly implemented. Additionally, an open loop system without a feedback function 178 can be used for more simple systems.

Figure 8:
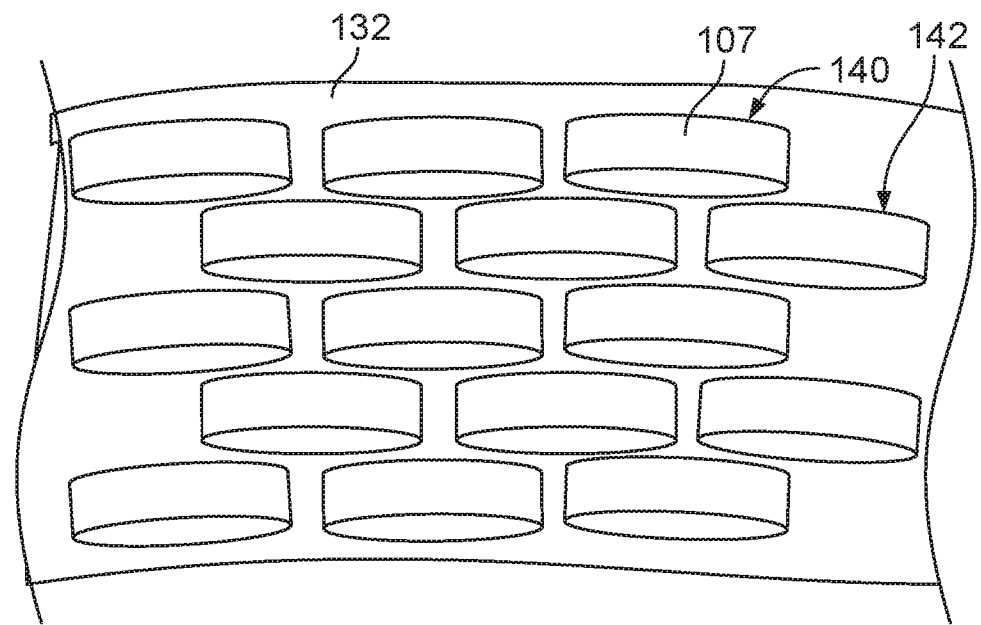
FIG. 8 is a detail view of a portion of the annular track of FIG. 7, taken along line 8-8 in FIG. 7, according to a first implementation.

FIG. 7 shows a top view of the ring structure 132 of the annular track 108. The ring structure 132 has a radius similar to a circumferential path of the pitch change links 106 to allow the pitch change links 106 to ride along the entire surface of the ring structure 132. FIG. 8 shows a detail view of a portion of the ring structure 132 of FIG. 7, taken along line 8-8 in FIG. 7. The portion of the ring structure 132 shows multiple rows 140 and 142 of bearings 107. The bearings 107 are staggered along the annular track (e.g., along the ring structure 132), arranged in rows 140 and 142 of alternating numbers of bearings (e.g., two bearings and three bearings, respectively). Each row 140 and 142 of bearings is offset to each other such that bearings 107 of one row 142 nest with bearings 107 of an adjacent row 140. Each row of bearings 107 can independently move vertically to form an undulating surface.

Figure 9:
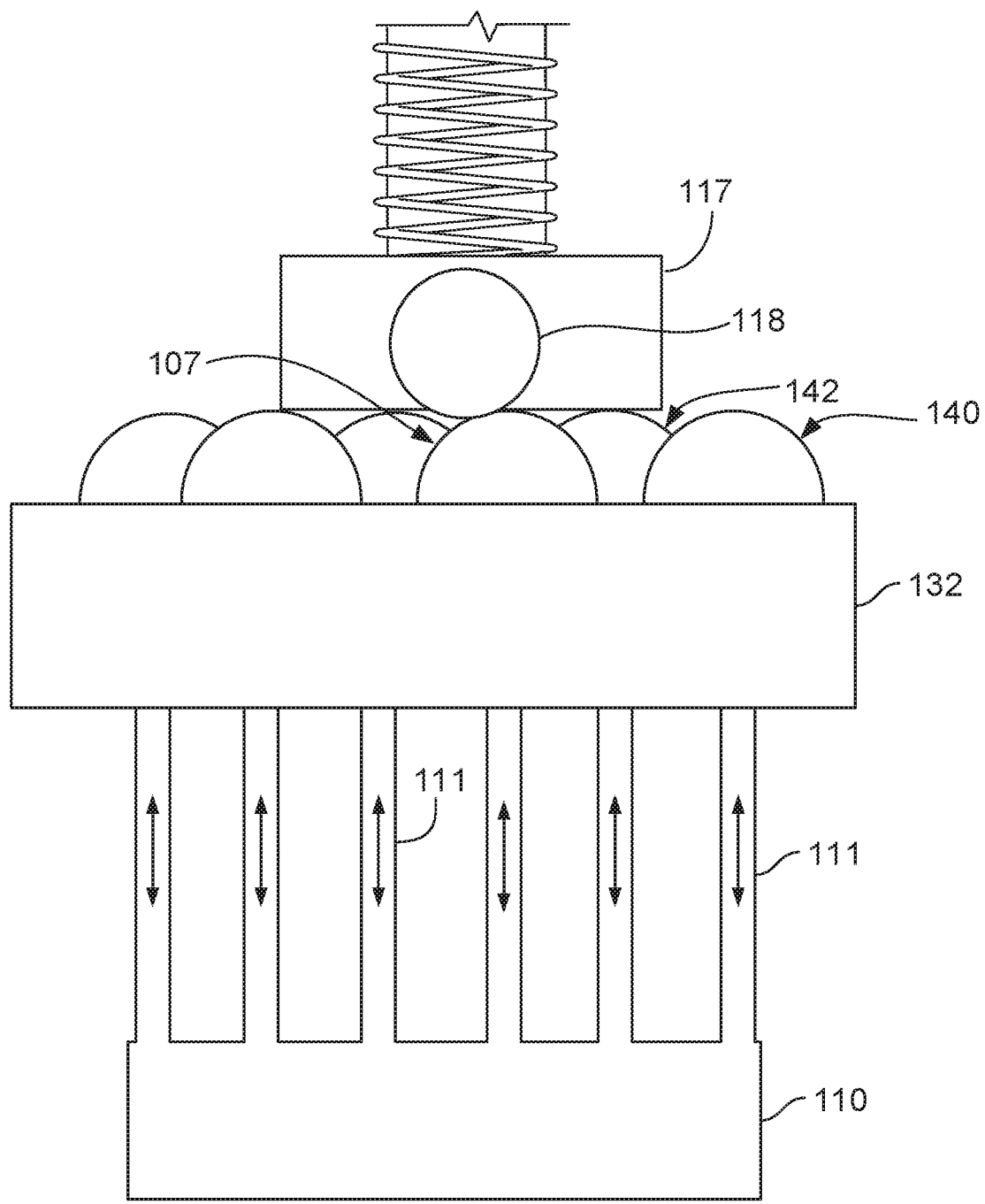
FIG. 9 is a schematic side view of the portion of the annular track of FIG. 8.

FIG. 9 shows the actuators 110 residing below the ring structure 132 with arms 111 of each actuator 110 extending through a bottom channel of the ring structure 132. Each arm 111 can support a respective bearing 107 or multiple bearings 107. The actuators 110 are also arranged in rows offset to one another to position the bearings 107 in alternating rows, as shown in FIG. 8. The bearings 107 can be fully retracted below the top surface of the ring structure 132, leaving the top surface of the ring structure 132 free from undulations. For example, when the control system is in a powered off state or in a failure mode, the bearings 107 are fully retracted to allow the rotorcraft to operate normally. The top surface of the ring structure 132 supports the roller 109 (see FIG. 6A) of the pitch change links 106 when the bearings 107 are fully retracted below the top surface of the ring structure 132.

Figure 10:
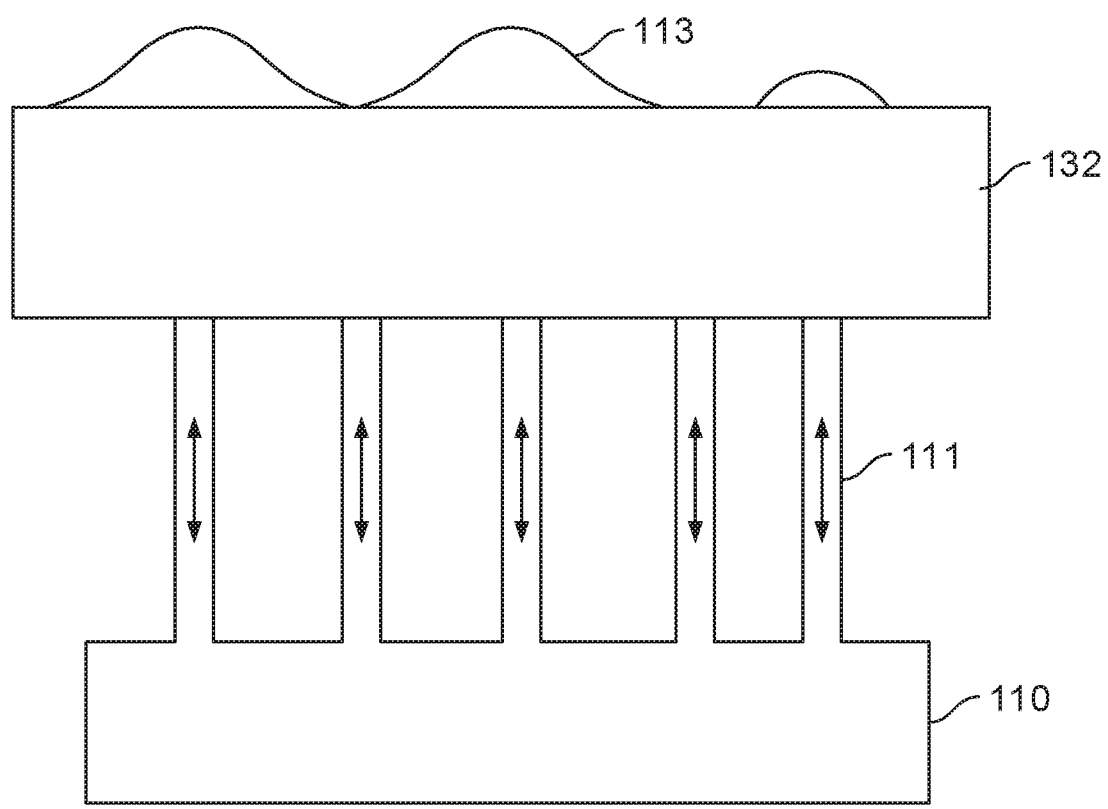
FIG. 10 is a schematic side view of the portion of the annular track of FIG. 8, according to a second implementation.
Figure 11:
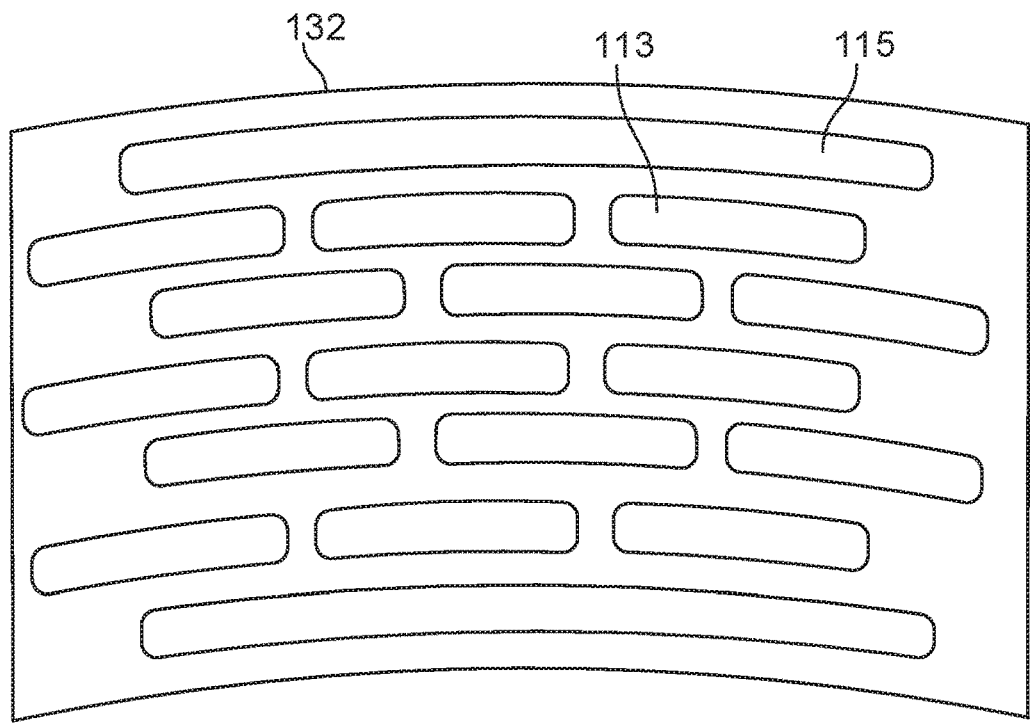
FIG. 11 is a schematic top view of the portion of the annular track of FIG. 10, with flat structures.
Figure 12:
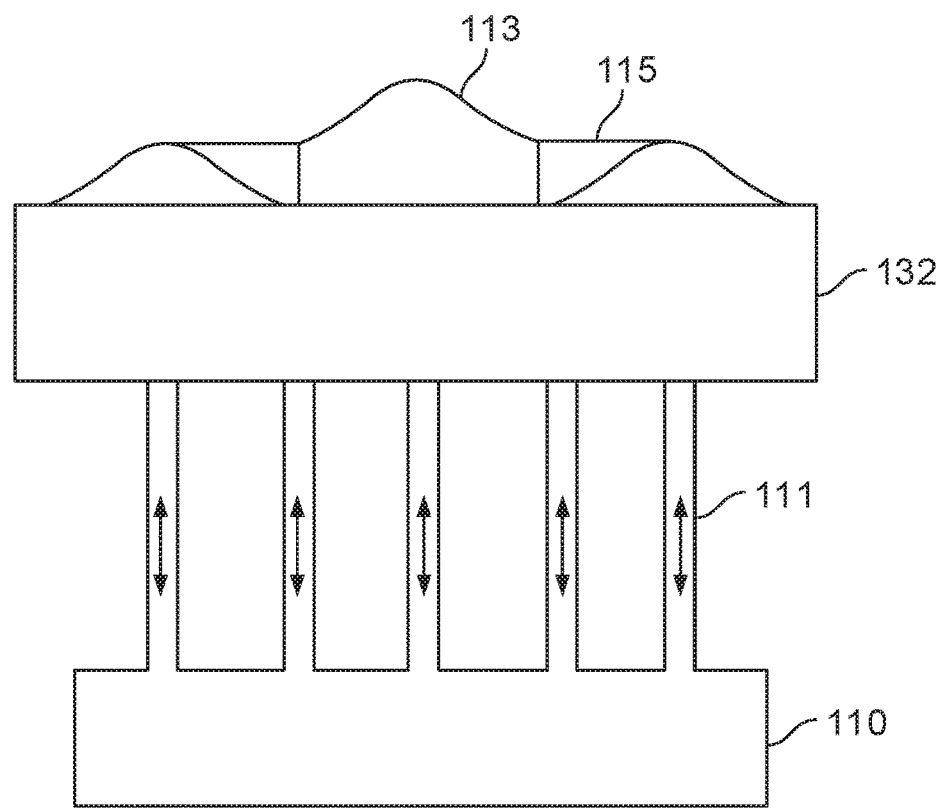
FIG. 12 is a schematic side view of the portion of the annular track of FIG. 11.

FIGS. 10-12 show an annular track 108 according to an implementation of the present disclosure. For example, referring to FIG. 10, the ring structure 132 can house different bearings or bearing members, such as curved structures 113. The curved structures 113 can be solid structures with a curved upper surface where the pitch change link can ride. As shown in FIG. 11, the curved structures 113 can be arranged in offset rows of structures of different lengths. Similar to the embodiment shown in FIGS. 8-9, multiple actuators 110 attached to a bottom surface of the multiple curved surfaces 113 move the curved surfaces 113 to form an undulating surface. Each actuator 110 moves its arm 111 independent from other actuators 110 to change the shape of the undulating surface. In some implementations, a mechanical fail safe block or lock (not shown) prevents the bearings or curved shapes 113 from protruding through the ring structure 132 no more than a predetermined distance.

Referring to FIGS. 11 and 12, the ring structure 132 can also house flat or gently sloped structures 115 disposed intermittently at different radians or distances along ring structure 132. The flat structures 115 can be curved structures with a flat top surface. The ring structure 132 can include a combination of bearings or bearing structures such as curved structures 113, roller bearings, and flat structures 115. The flat structures 115 are also moved by respective actuators 110 to allow the annular track to change the pitch of the rotor blades for longer durations or distances of the ring structure 132. As shown in FIG. 12, the flat surfaces 115 allow longer, smoother undulating inputs into the pitch change links 106.

Figure 13:
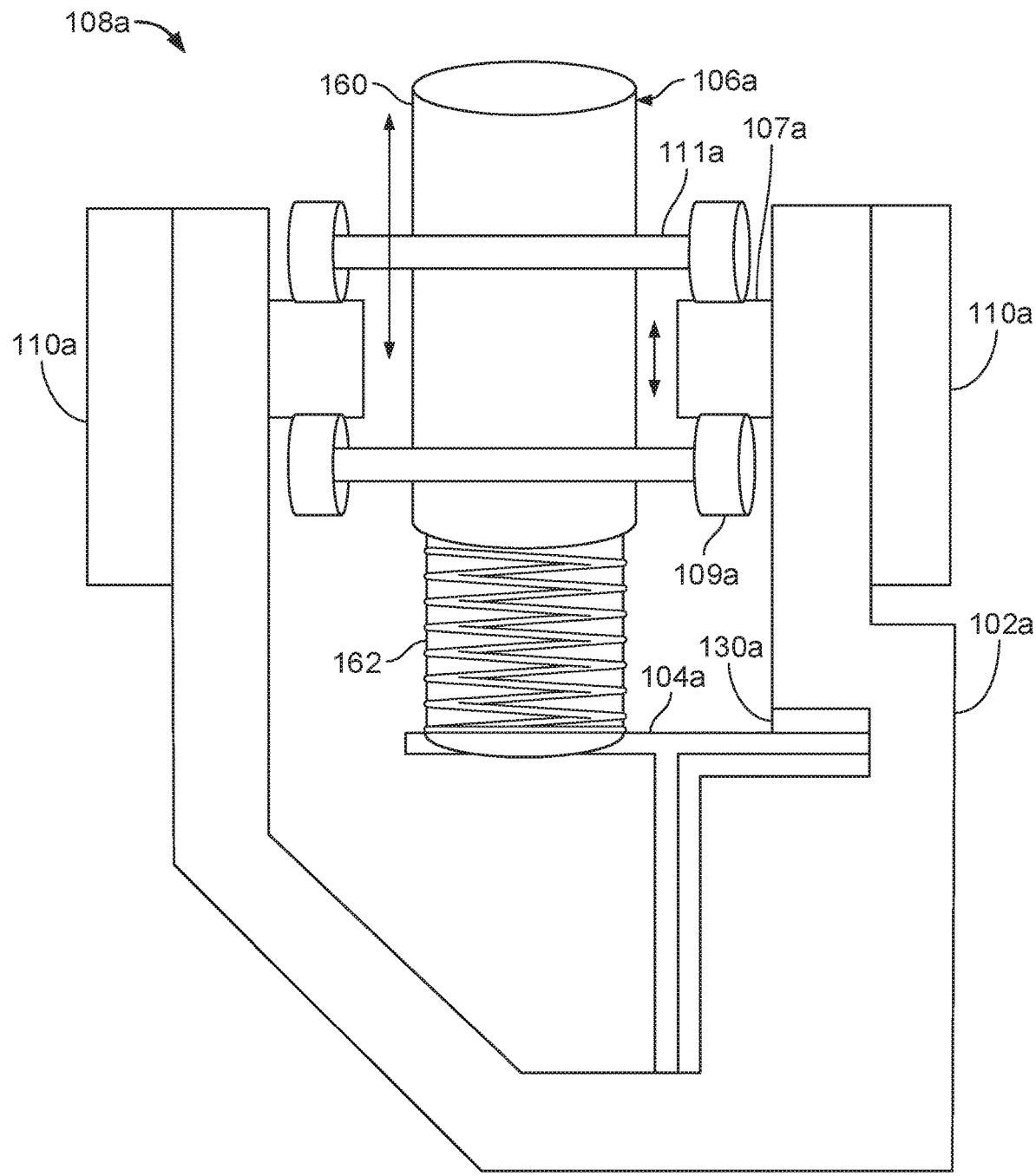
FIG. 13 is a schematic front view, partially cross-sectional, of a portion of a rotorcraft swashplate assembly, according to a second implementation.

FIG. 13 shows a portion of the rotorcraft swashplate assembly according to a second implementation of the present disclosure. The swashplate assembly features an annular track 108a that is not disposed underneath the pitch change link 106a. The rotatable swashplate 104a resides within the rotationally fixed swashplate 102a on a bottom end of the rotationally fixed swashplate 102a. Each pitch change link 106a is a telescopic pitch change link having a first arm 162 fixed to the rotatable swashplate 104a and a second arm 160 attached to the rotor blade. The first arm 162 extends partially inside the second arm 160 to extend or retract with respect to the second arm 160. The second arm 160 includes the rollers 109a that ride on the bearings 107a of the annular track 108a. Bearing structures 111a fixed to the second arm 160 attached the rollers 109a to the second arm 160. The second arm can have multiple rollers 109a positioned to roll on a top and bottom surface of the bearings 107a. The second arm 160 moves up and down with respect to the first arm 162 as the rollers 109a ride on the multiple bearings 107a during rotation of the rotor blade. The bearings 107a are moved by respective actuators 110a attached to respective sides of the rotationally fixed swashplate 102a. The bearings 107a can be roller bearings, curved structures, flat structures, or any combination of bearings. In implementations where the pitch change link 106a has only one set of rollers 109a that ride on the bottom surface of the bearings 107a, the pitch change link 106a has a spring disposed around the first arm 162 residing between the second arm 160 and the rotatable swashplate 104a to bias the second arm 160 (e.g., the rollers 109a) against the bearings 107a during rotation of the pitch change link 106a.

Figure 14:
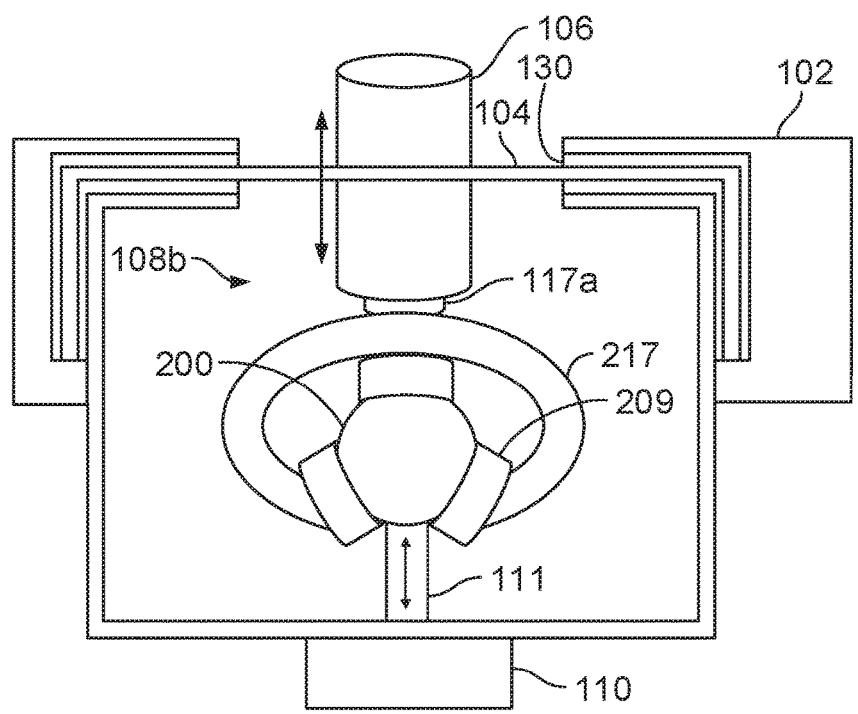
FIG. 14 is a schematic front view, partially cross-sectional, of a portion of a rotorcraft swashplate assembly, according to a third implementation.

FIG. 14 shows a portion of the rotorcraft swashplate assembly according to a third implementation of the present disclosure. The swashplate assembly features a variable annular rail 108b on which the pitch change links 106b ride as the pitch change links 106b rotate with the rotor. Similar to the swashplate assembly of FIG. 6A, the swashplate assembly has a rotationally fixed swashplate 102, a rotatable swashplate 104, and bearings 130 that allow the rotatable swashplate 104 to rotate with respect to the rotationally fixed swashplate 102. Each pitch change link 106b has an end 117a attached to a respective bearing structure 217. Unlike the swashplate assembly of FIG. 6A, the pitch change links 106b do not need a spring to bias the pitch change link 106b against the annular rail 108b because the pitch change links are engaged, by the rollers 209, to the annular rail 108b.

The annular rail 108b includes a movable ring-shaped rail assembly 200 and multiple actuators 110b that move one or more members of the ring-shaped rail assembly 200. The actuators 110b are attached to a bottom surface of the rotationally fixed swashplate 102. The actuators 110b can be mechanically linked to adjacent actuators (not shown) to prevent 'hardover' extreme failures and allow safe operation of the rotorcraft assembly. The bearing structure 217 holds a roller assembly 219 that includes one or more rollers 209 (e.g., roller bearings) arranged to engage with (e.g., embrace) and ride on the movable ring-shaped rail assembly 200. For example, the bearing structure 217 can have a C-shaped cross-section with rollers 209 rotatably attached to the bearings structure 217 and arranged to ride on respective surfaces of the movable ring-shaped rail assembly 200. The rollers 209 ride on different surfaces of the ring-shaped rail assembly 200 to prevent the roller assembly 219 from disengaging the ring-shaped rail assembly 200 as the roller assembly 219 of each pitch change link 106b rides on the annular rail 108b during rotation of the rotor blade.

Figure 15:
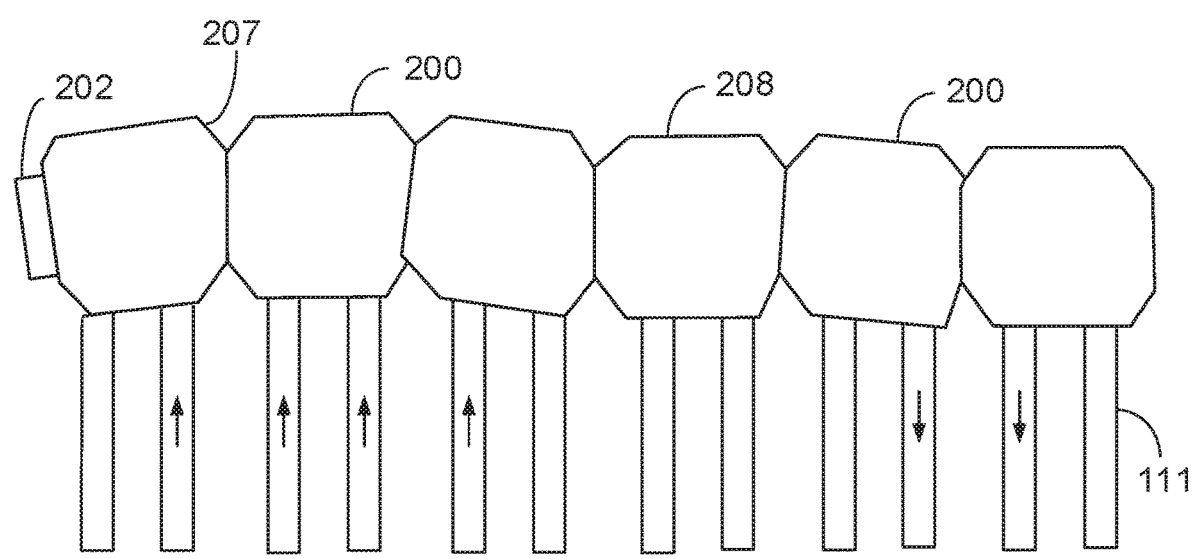
FIG. 15 is a schematic side view of a portion of the rotorcraft swashplate assembly of FIG. 14.

Referring also to FIG. 15, the actuators 110 of the annular rail 108b are disposed underneath movable rail members 208 of the ring-shaped rail assembly 200. The movable rail members 208 support the roller assembly 219 of each pitch change link 106b. The actuators 110 (e.g., linear actuators) have arms 111 that can be attached or detached from respective rail members 208. Similar to the assembly of FIG. 6A, the arms 111 of the actuators 110b move at least some of the rail members 208 independently from other rail members 208 to change a pitch of each rotor blade connected to a respective pitch change link 106 as the roller assembly 219 of each pitch change link 106 rides on the movable rail members 208 during rotation of the rotor blade. Each rail member 208 can have chamfered edges 207 or beveled edges (e.g., chamfered top edges and chamfered bottom edges) that allow adjacent rail members 208 to tilt in opposite directions to form a curved surface on which the rollers 209 ride. It will be understood that the chamfered edges can be minimal, such as slightly round or smooth edges. For example, each rail member 208 is coupled to actuators 110b, with each actuator 110 disposed at different length locations of the rail member 208. Each actuator 110 moves independently from the other to tilt the respective rail member 208 independent from other rail members 208. With the rail members tilted 208, the chamfered edges 207 allow the roller assembly 219 to smoothly transition between the adjacent rail members 208.

Figure 16:
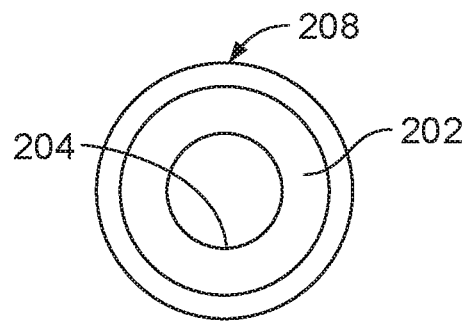
FIG. 16 is a schematic front view of a rail member of the portion of the rotorcraft assembly of FIG. 14.
Figure 17:
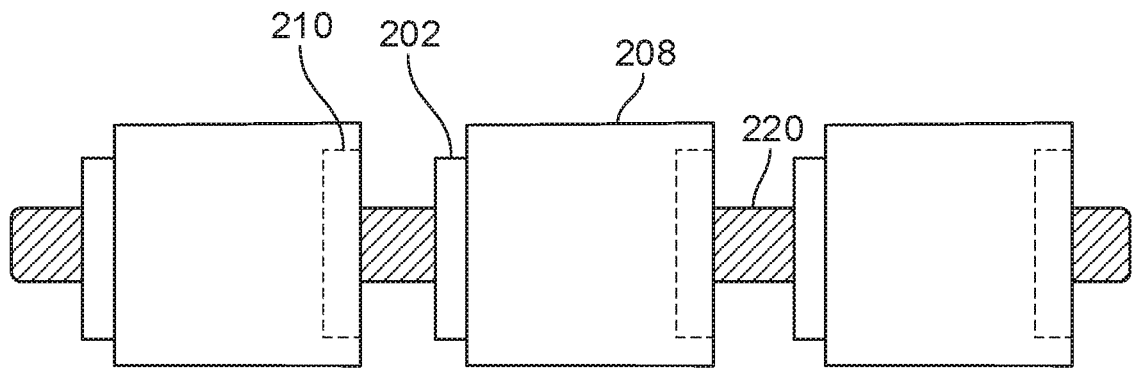
FIG. 17 is a schematic top view of a rail member assembly of the portion of the rotorcraft assembly of FIG. 14.

As shown in FIGS. 16 and 17, the rail members 208 are arranged to assemble together. For example, each rail member 208 has a tapered end 202 and a notched end 210 opposite the tapered end 202. The notched end 210 of each rail member 208 receives the tapered end 202 of an adjacent rail member 208 to form, collectively, the ring-shaped rail assembly 200. The rail members 208 can be interconnected by a flexible link 220 (e.g., a cable) extending through an aperture 204 of each rail member 208 to form a chain of interconnected rail members 208. Each rail member 208 has a circular angularity such that when interconnected, the rail members 208 collectively form a ring-shaped annular rail. For example, from a top view, each rail member 208 has a first side (i.e., an interior side of the ring-shaped annular rail) with a length '$L_s$' smaller than a length '$L_l$' of an opposite, exterior side. In some implementations, each rail member 208 can have foolproof fittings to allow assembly of the rail members 208 in only one direction.

Figure 18:
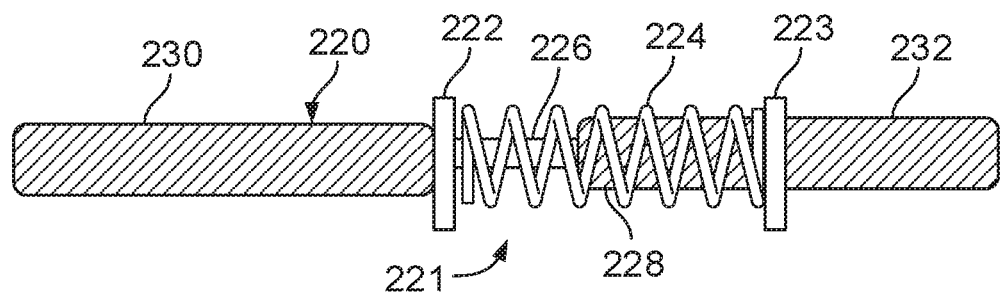
FIG. 18 is a schematic top view of a cable of the portion of the rotorcraft assembly of FIG. 14.

FIG. 18 shows the flexible link 220 with one or more adjustable fittings 221. The adjustable fitting 221 allows the flexible link 220 to stretch when the annular rail 108b demands large variations to form the variable or undulating surface. The adjustable fitting 221 also allows the annular rail 108b to be maintained and adjusted, for example, under extreme weather conditions. The adjustable fitting 221 includes a spring 224 (e.g., a slip spring) disposed between two end caps 222 and 223. One of the end caps 223 is threadedly connected to one end 232 of the flexible link 220 to adjust, as the cap 223 moves along the flexible link 220, a preload of the spring 224 to adjust a length of the flexible link 220. The one end 232 of the flexible link 220 is connected, by a link 226, to a second end 230 of the flexible link 220 to close the loop of the flexible link 220. For example, the end caps 222 and 223 can be threaded on a wire sheath of the flexible link 220 to adjust the spring pre-load.

Figure 19:
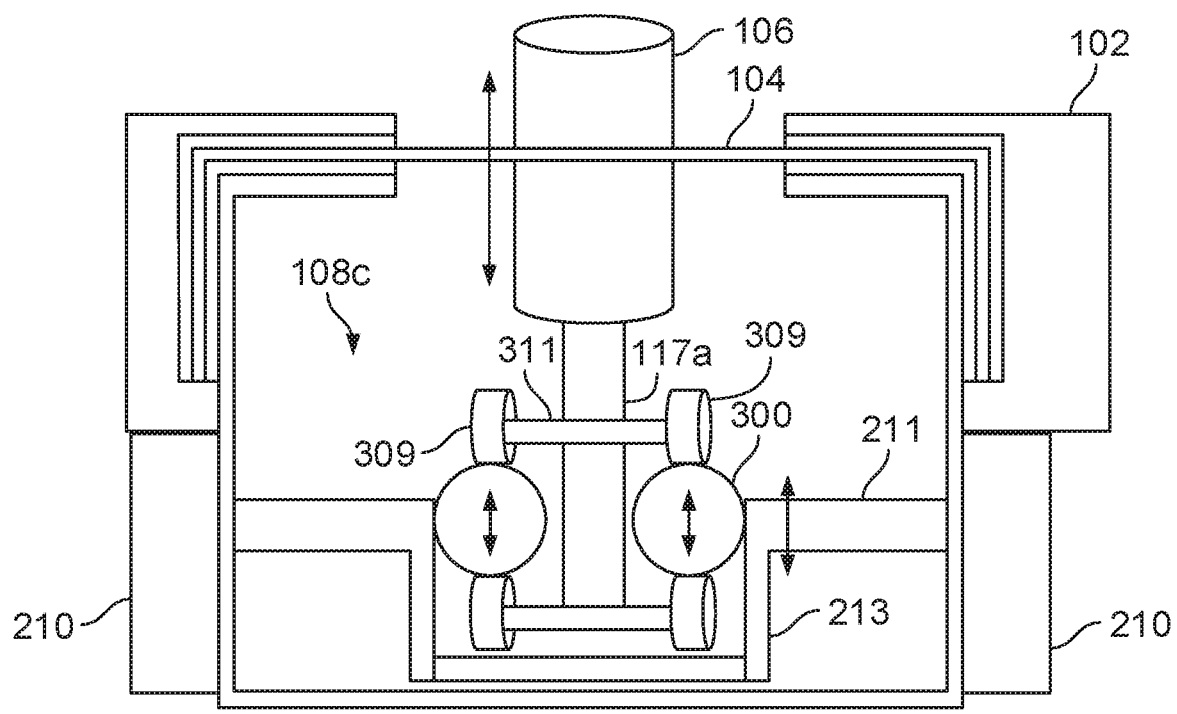
FIG. 19 is a schematic front view, partially cross-sectional, of a portion of a rotorcraft swashplate assembly, according to a fourth implementation.

FIG. 19 shows a portion of the rotorcraft swashplate assembly according to a fourth implementation of the present disclosure. Similar to the swashplate assembly of FIG. 14, an annular rail 108c of the swashplate assembly includes one or more ring-shaped rail assemblies 300 and multiple actuators 210 that move one or more members of the movable ring-shaped rail assemblies 300. The main difference is that the annular rail 108c includes two ring-shaped rail assemblies 300 and that the annular rail 108c includes two sets of lateral actuators 210 coupled to opposite sides of the rotatably fixed swashplate 102. Each movable member of each ring-shaped rail assembly 300 is attached to a lateral actuator 210. The lateral actuators 210 have arms 211 attached to respective movable members of each ring-shaped rail assembly 300. The lateral actuators 210 are also attached to a fail-safe structure 213. The fail-safe structure 213 ensures one actuator 210 can power or move a failed sister actuator 210. Each pitch change link 106c has an end 117a attached to one or more bearing structures 311 that hold respective roller bearings 309 on each side of the bearing structure 311. For example, a first bearing structure 311 can be disposed above the movable ring-shaped rail assemblies 300 and a second bearing structure 311 can be disposed underneath the movable ring-shaped rail assemblies 300 to ride on a bottom surface of the movable ring-shaped rail assemblies 300. Similar to the swashplate assemblies of FIGS. 5 and 13, each pitch change link 106c extends through an aperture of the rotatable swashplate 104 to ride on the annular rail 108c.

Figure 20:
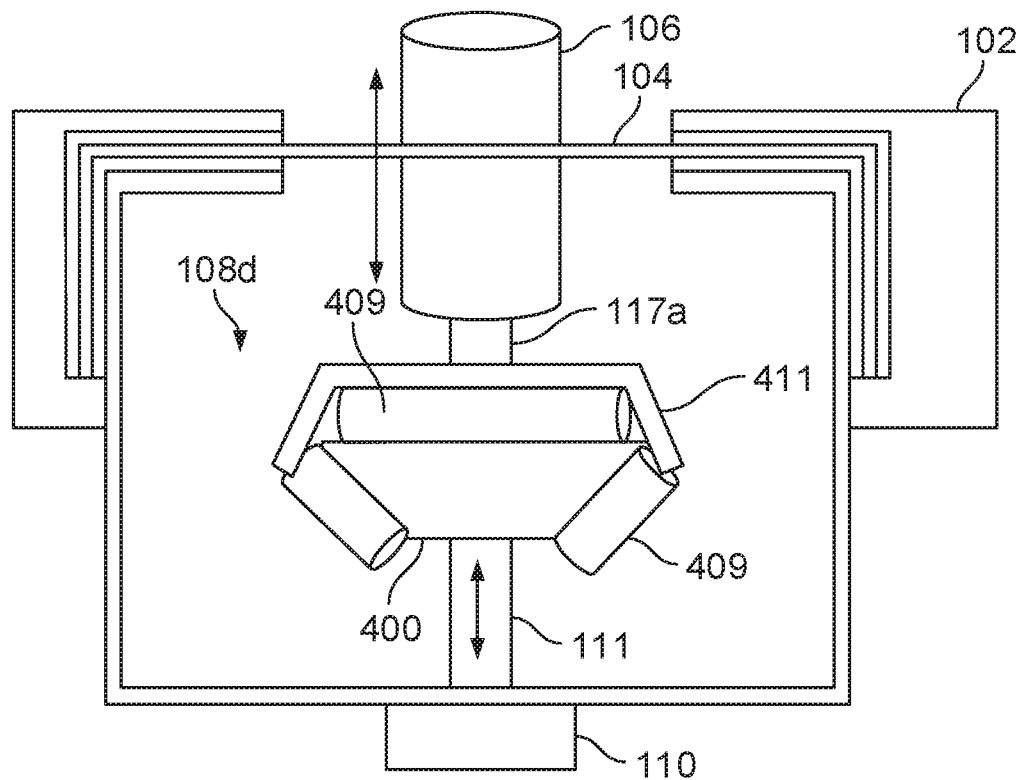
FIG. 20 is a schematic front view, partially cross-sectional, of a portion of a rotorcraft swashplate assembly, according to a fifth implementation.

FIG. 20 shows a portion of the rotorcraft swashplate assembly according to a fifth implementation of the present disclosure. Similar to the swashplate assembly of FIG. 14, an annular rail 108d of the swashplate assembly has a movable ring-shaped rail assembly 400 and multiple actuators 110d that move one or more members of the ring-shaped rail assembly 400. The main difference is that the ring-shaped rail assembly 400 has a trapezoidal cross-section. The ring-shaped rail assembly 400 is moved by actuators 110d attached to a bottom surface of the rotatably fixed swashplate 102. The bearing structure 411 of each pitch change link 106d holds roller bearings 409 arranged to engage with (e.g., embrace) and ride on the movable ring-shaped rail assembly 400. For example, the bearing structure 411 can have a C-shaped cross-section with bearings 409 rotatably attached to the bearings structure 411 and arranged to ride on respective flat surfaces of the movable ring-shaped rail assembly 400. The bearings 409 ride on different surfaces of the ring-shaped rail assembly 400 to prevent the pitch change link 106d from disengaging the ring-shaped rail assembly 400 as the pitch change link 106d rides on the annular rail 108b during rotation of the rotor blade.

Figure 21:
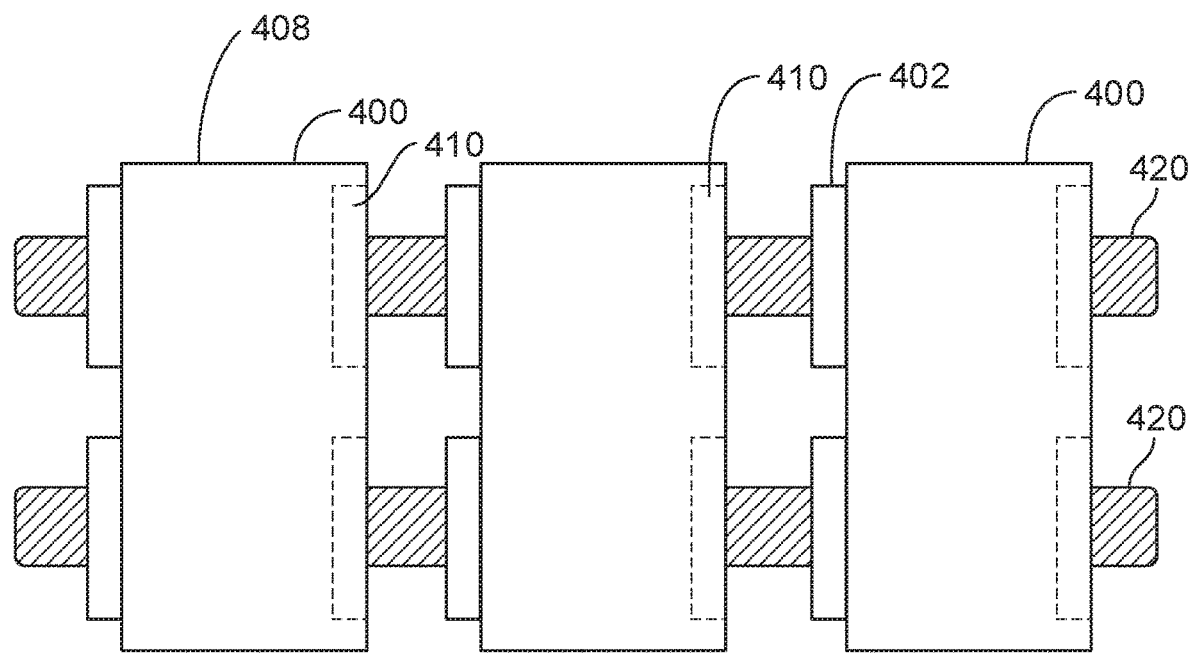
FIG. 21 is a schematic top view of a rail member assembly of the portion of the rotorcraft assembly of FIG. 20.
Figure 22:
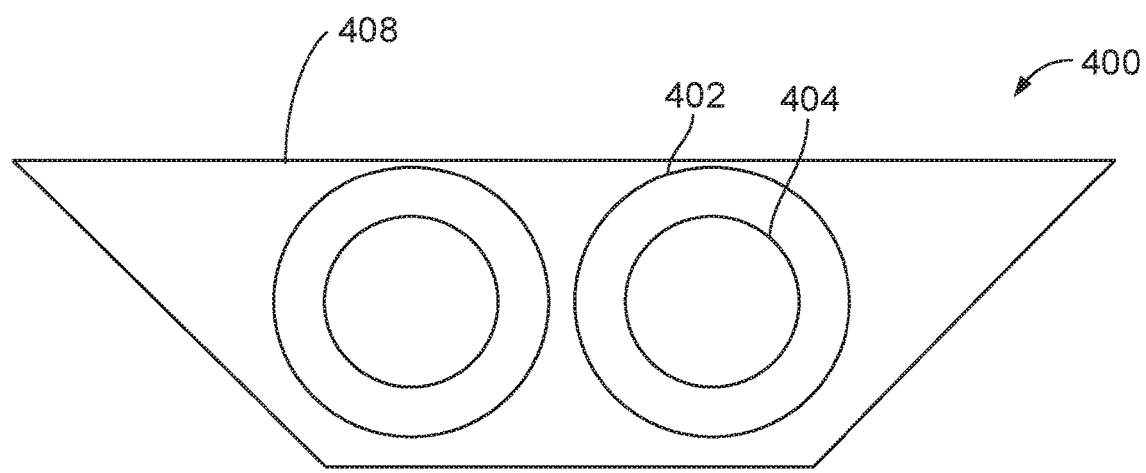
FIG. 22 is a schematic front view of a rail member of the portion of the rotorcraft assembly of FIG. 20.

FIGS. 21 and 22 show the individual movable rail members 408 of the ring-shaped rail assembly 400. Similar to the rail members of FIGS. 16 and 17, the rail members 408 are arranged to assemble in a row to form the ring-shaped rail assembly 400. For example, each rail member 408 has a tapered end 402 (e.g., with two rims extending from the rail member) and a notched end 410 (e.g., with two notched holes that receive the rims) opposite the tapered end 402. The notched end 410 of each rail member 408 receives the tapered end 402 of an adjacent rail member 408 to form, collectively, the ring-shaped rail assembly 400. The rail members 408 can also be interconnected by two or more flexible links 420 that extend through apertures 404 of each rail member 408 to form a chain of interconnected rail members 408.

Figure 23:
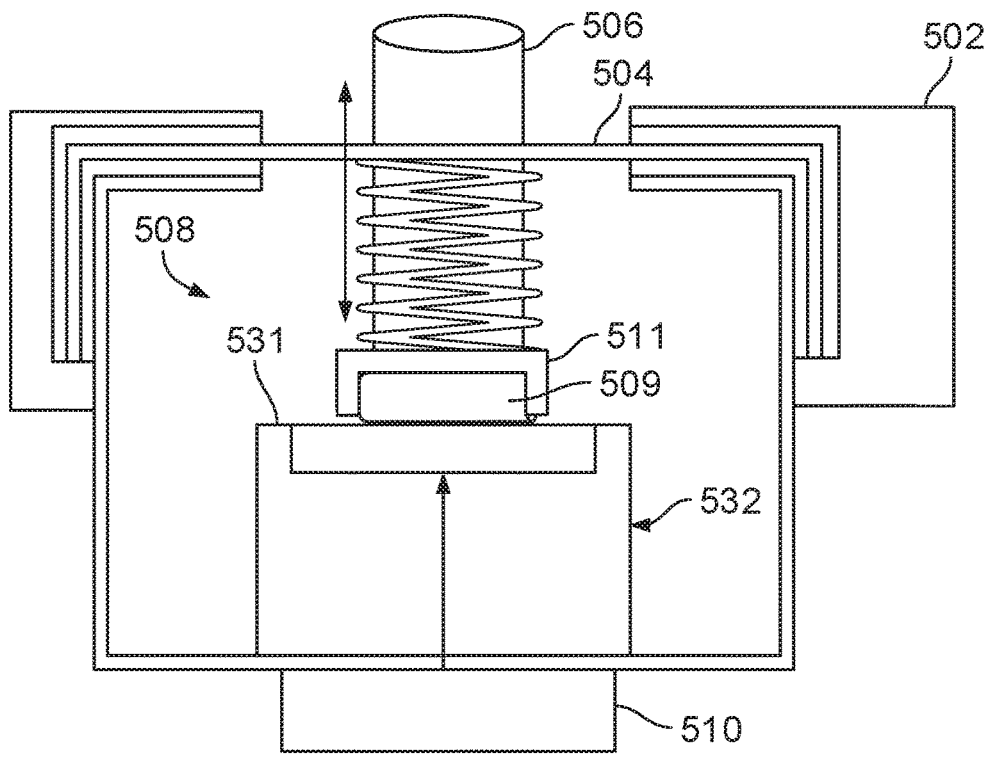
FIG. 23 is a schematic front view, partially cross-sectional, of a portion of a rotorcraft swashplate assembly, according to a sixth implementation.

FIG. 23 shows a portion of the rotorcraft swashplate assembly according to a sixth implementation of the present disclosure. The swashplate assembly features a track 508 on which the pitch change links 506 ride as the pitch change links 506 rotate with the rotor. Similar to the swashplate assembly of FIG. 6A, the swashplate assembly has a rotationally fixed swashplate 502, a rotatable swashplate 504, and bearings that allow the rotatable swashplate 504 to rotate with respect to the rotationally fixed swashplate 502. Each pitch change link 506 has an end attached to a bearing structure 511 that holds a roller 509 that rides along the track 508. Similar to the swashplate assembly of FIG. 6A, each pitch change link 506 extends through an aperture of the rotatable swashplate 504 and has a spring 534 that biases the pitch change link 506 against the track 508.

The track 508 has a ring structure 532 disposed inside and coupled to the rotationally fixed swashplate 502. The ring structure 532 supports a piezoelectric ring 531 that supports the roller 509 of each pitch change link 506. The track 508 also includes multiple actuators 510 attached to a bottom surface of the rotationally fixed swashplate 502. The actuators 510 can be voltage generators. The actuators 510 are arranged along the piezoelectric ring 531 (e.g., evenly distributed along the ring 532) and are electrically coupled to the piezoelectric ring 531. For example, the ring structure 532 has channels that receive a portion (e.g., a conductor) of a respective actuator 510 from a bottom surface of the ring structure 532 and at least a portion of the piezoelectric ring 531 from a top end of the channel to support the piezoelectric ring 531. Each actuator 510 applies a voltage independently from the other actuators 510 to change a shape (for example, flex the surface of the ring 532) of the piezoelectric ring 531 at specific azimuth locations of the ring 531. Changing the shape of the piezoelectric ring 531 includes changing the upper surface of the piezoelectric ring 531 at specific azimuth locations to form a curve. The curved surface changes a pitch of each rotor blade connected to a respective pitch change link 506 as the roller 509 of each pitch change link 506 rides on the piezoelectric ring 531 during rotation of the rotor blade. Thus, the actuators 510 change the shape of the piezoelectric ring 531 to form an adjustable hoop with an undulating surface extending along a length of the track 508.

In some implementations, the piezoelectric ring 531 has multiple piezoelectric members that collectively form the piezoelectric ring 531. The piezoelectric members are supported on the ring structure 532. In such implementations, each actuator 510 applies voltage to a respective piezoelectric member independently from the other actuators 510 to change the shape of the piezoelectric member independently from the other piezoelectric members. In some implementations, the actuators 510 can be directly connected to the piezoelectric ring 531, without the ring structure 532.

Figure 24:
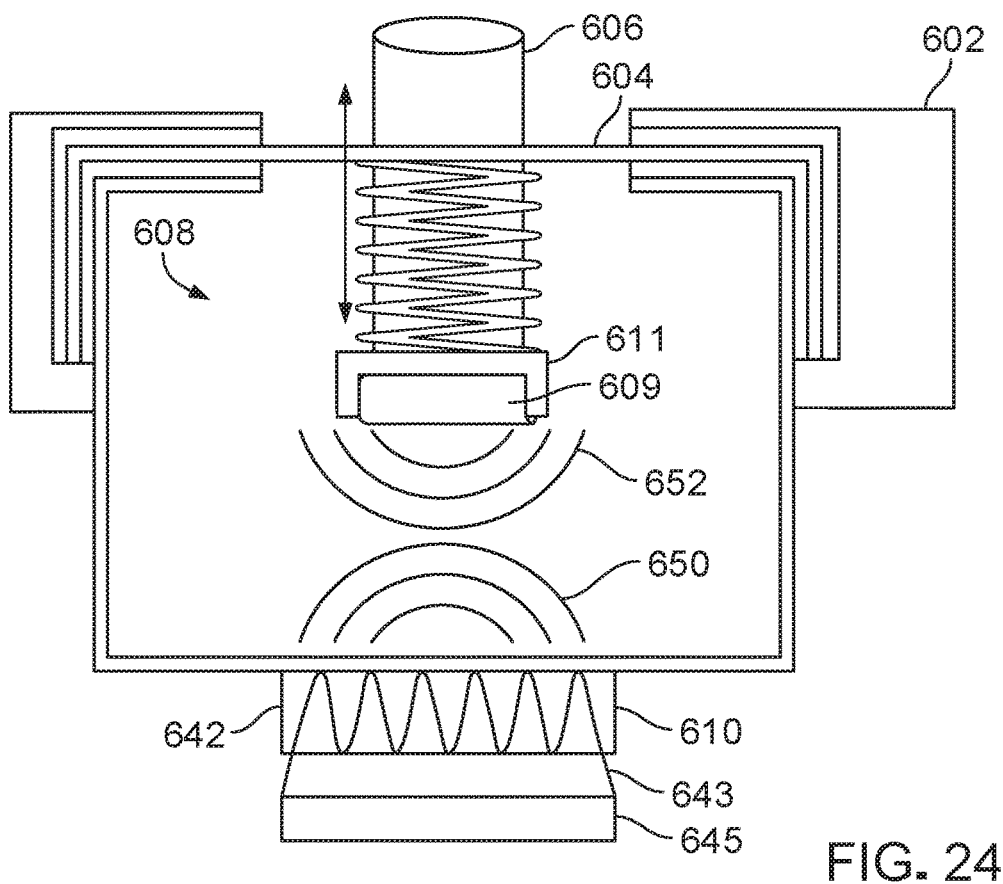
FIG. 24 is a schematic front view, partially cross-sectional, of a portion of a rotorcraft swashplate assembly, according to a seventh implementation.

FIG. 24 shows a portion of the rotorcraft swashplate assembly according to a seventh implementation of the present disclosure. The swashplate assembly features a track 608 made of electromagnetic fields 650 produced by electromagnets 610. For example, the electromagnets 610 are arranged evenly along the rotationally fixed swashplate 602 to form a continuous ring-shaped electromagnetic field. Each pitch change link 606 has a magnet 609 that produces or emits a magnetic field 652 that repels the electromagnetic fields 650 generated by the electromagnets 610. By repelling the electromagnetic fields 650 generated by the electromagnets 610, the pitch change links 606 ride on the electromagnetic fields 650 as the pitch change links 606 rotate with the rotor.

The electromagnets 610 are evenly arranged along and coupled to the rotationally fixed swashplate 602. Each electromagnet 610 generates an electromagnetic field in a direction opposite to the magnetic field produced by the magnet 609 of the pitch change link 606. Each electromagnet 610 generates an electromagnetic field with a strength independent from the electromagnetic fields generated by the other electromagnets 610. Changing the strength of the electromagnetic fields 650 at specific azimuth locations causes the pitch change links 606 to move up and down (changing the pitch of each rotor blade connected to the pitch change link 606) as the magnet 609 of each pitch change link 606 is repelled from the multiple electromagnets 610 during rotation of the rotor blade. In some implementations, the magnet 609 of the pitch change links 606 can be a second electromagnet that generates an electromagnetic field that is repelled by the electromagnetic fields 650 of the electromagnets 610.

Each of the electromagnets 610 can have a conductor 643 wound around a magnetic core 642. The conductor is electrically coupled to a processing device 645 that changes one or more parameters of a current flowing through the conductor 643 around the magnetic core 642 to change the strength of the electromagnetic field 650. The processing device 645 includes the same or similar instructions as the processing device of FIG. 6A. The processing device 645 changes the strength of the electromagnetic field 650 based on real-time data received, by the processing device 645, from rotorcraft sensors.

Although the following detailed description contains many specific details for purposes of illustration, it is understood that one of ordinary skill in the art will appreciate that many examples, variations and alterations to the following details are within the scope and spirit of the disclosure. Accordingly, the exemplary implementations described in the present disclosure and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A rotorcraft swashplate assembly comprising:
    a rotationally fixed swashplate configured to be fixed against rotating with a rotorcraft rotor configured to rotate about a rotational axis;
    a rotatable swashplate configured to reside between rotor blades of the rotor and the rotationally fixed swashplate, and configured to be coupled to the rotor to rotate with the rotor;
    a plurality of pitch change links, each pitch change link configured to be coupled to a respective rotor blade, to the rotorcraft rotor, and to the rotatable swashplate to rotate with the rotor; and
    an annular track coupled to the rotationally fixed swashplate and configured to support each pitch change link riding on the annular track as each pitch change link rotates with the rotor, the annular track comprising:
        a plurality of bearings each comprising a surface upon which each pitch change link rides, and
        a plurality of actuators coupled to the rotationally fixed swashplate and to the plurality of bearings to move at least some of the bearings independently from other bearings, changing a shape of the annular track and thereby the pitch of each rotor blade connected to a respective pitch change link as each pitch change link rides on the annular track during rotation of the rotor blades.

2. The rotorcraft swashplate assembly of claim 1, wherein the plurality of actuators are linear actuators configured to move parallel to the rotational axis, and wherein each of the plurality of linear actuators comprises a first end coupled to at least one respective bearing of the plurality of bearings, each of the plurality of linear actuators configured to move the at least one respective bearing to which the linear actuator is coupled.

3. The rotorcraft swashplate assembly of claim 1, further comprising a processing device communicatively coupled to the plurality of actuators, the processing device configured to independently actuate each actuator based on real-time data received from rotorcraft sensors.

4. The rotorcraft swashplate assembly of claim 3, wherein the plurality of actuators are configured to change an elevation of the bearings with respect to the rotationally fixed swashplate at specified azimuth locations around the annular track such that the plurality of actuators change the pitch of the rotor blade at specified azimuth locations as each pitch change link rides on the plurality of bearings during rotation of the rotor blade.

5. The rotorcraft swashplate assembly of claim 1, wherein each pitch change link comprises a roller configured to ride on the annular track.

6. The rotorcraft swashplate assembly of claim 5, wherein each pitch change link is configured to extend through an aperture of the rotatable swashplate, and wherein the swashplate assembly comprises a spring disposed around each pitch change link between the roller and a surface of the rotatable swashplate configured to bias the pitch change link against the annular track.

7. The rotorcraft swashplate assembly of claim 1, wherein the bearings are arranged to form an annular surface of the annular track and their movement enabling the surface to undulate around the annular track.

8. The rotorcraft swashplate assembly of claim 1, wherein each bearing of the plurality of bearings comprises one of 1) a roller bearing, 2) a curved structure, or 3) a curved structure with a flat top surface.

9. The rotorcraft swashplate assembly of claim 8, wherein the plurality of bearings are staggered along the annular track and arranged in rows of alternating numbers of bearings, each row offset to each other such that bearings of one row nest with bearings of an adjacent row.

10. The rotorcraft swashplate assembly of claim 1, wherein the annular track further comprises a ring structure attached to the rotationally fixed swashplate, the ring structure defining a plurality of channels, each channel configured to receive a portion of a respective actuator from a bottom surface of the ring structure and at least a portion of a respective bearing from a top surface of the ring structure to support the respective portions of the plurality of actuators and the plurality of bearings.

11. The rotorcraft swashplate assembly of claim 10, wherein the top surface of the ring structure is configured to support the pitch change link when the bearings are fully retracted below the top surface of the ring structure.

12. The rotorcraft swashplate assembly of claim 10, wherein the bearings fully retract below the top surface of the ring structure when the respective actuators lose power or are deactivated.

13. The rotorcraft swashplate assembly of claim 1, wherein each pitch change link is a telescopic pitch change link comprising a first arm configured to be attached to the rotatable swashplate and coupled to a second arm configured to be attached to the respective rotor blade, the second arm including a roller and configured to move with respect to the first arm as the roller rides on the annular track during rotation of the rotor blade.

14. The rotorcraft swashplate assembly of claim 1, further comprising a processing device comprising a control system configured to actuate each actuator based on manual input and sensor input to undulate the annular track.

15. A method of operating a rotorcraft, the method comprising:
on a rotorcraft comprising a swashplate assembly including 1) a rotationally fixed swashplate, 2) a rotatable swashplate, 3) a plurality of pitch change links, each pitch change link coupled to a respective rotor blade and to the rotatable swashplate, and 4) an annular track coupled to the rotationally fixed swashplate to support each pitch change link as each pitch change link rotates with the rotor to ride on the annular track, the annular track comprising a plurality of actuators configured to move the annular track;
controlling a number of actuators of the plurality of actuators to change a surface shape of the annular track such that the annular track changes the pitch of the pitch change links as the pitch change links ride on the annular track to at least one of 1) counteract rotational vibrations of the rotor blades attached to the pitch change links or 2) adjust a pitch of the pitch change links at a specific azimuth location of the pitch change links.

16. The method of claim 15, further comprising, prior to controlling the number of actuators, receiving, by a processing device and from a plurality of sensors attached to the rotorcraft, a plurality of values representing at least one of 1) operating parameters of the rotorcraft collected over time, 2) environmental data, and 3) control inputs.

17. The method of claim 16, wherein the plurality of values comprise at least one of the following: airspeed of the rotorcraft, gross weight of the rotorcraft, center of gravity of the rotorcraft, pressure altitude, temperature, wind speed, wind direction, height above ground of the rotorcraft, sideslip angle of the rotorcraft, rotor speed, engine torque applied to the rotor, rotor blade pitch position and location for each rotor blade, tail rotor blade pitch position and location, a degree difference at which a pitch change link input affects the position and state of the blade, flight control mixing data, status and mode of vibration control systems, position of in-line automatic flight control system servos, blade flap angle, lead-lag location of blade, lead-lag damper characteristics, and flight control position for one or more of 1) collective, 2) lateral cyclic, 3) longitudinal cyclic, or 4) pedal position.

18. The method of claim 16, wherein controlling the number of actuators comprises controlling, by the processing device and based on the plurality of values, the actuators to undulate the annular track.

19. A swashplate assembly comprising:
a swashplate configured to be fixed against rotating with a rotorcraft rotor; and
a plurality of pitch change links, each pitch change link coupled to a respective rotor blade of a rotorcraft and to a rotorcraft rotor to rotate with the rotor, each pitch change link configured to ride on an annular track of the swashplate, the annular track comprising a plurality of movable surfaces upon which the plurality of pitch change links ride, each of the plurality of movable surfaces configured to move independently from each other and with respect to the swashplate to undulate the annular track and change a pitch of each rotor blade connected to a respective pitch change link as each pitch change link rides on the annular track during rotation of the rotor blade.

20. The swashplate assembly of claim 19, further comprising a processing device communicatively coupled to the annular track, the processing device configured to undulate the annular track based on data received from one or more of 1) manual inputs and 2) sensor data.

* * * * *